United States Patent
Spain, Jr.

(10) Patent No.: US 9,408,030 B1
(45) Date of Patent: Aug. 2, 2016

(54) ESTIMATING PROXIMITY TO A MOBILE STATION BY MANIPULATING AN INTERFERING SIGNAL

(71) Applicant: Polaris Wireless, Inc., Mountain View, CA (US)

(72) Inventor: David Stevenson Spain, Jr., Portola Valley, CA (US)

(73) Assignee: Polaris Wireless, Inc., Mountain View, CA (US)

( * ) Notice: Subject to any disclaimer, the term of this patent is extended or adjusted under 35 U.S.C. 154(b) by 0 days.

(21) Appl. No.: 14/882,129

(22) Filed: Oct. 13, 2015

Related U.S. Application Data

(62) Division of application No. 14/507,425, filed on Oct. 6, 2014, now Pat. No. 9,173,064.

(51) Int. Cl.
  *H04W 4/02* (2009.01)
  *H04W 52/36* (2009.01)
  *H04W 24/10* (2009.01)
  *H04B 17/318* (2015.01)

(52) U.S. Cl.
  CPC ............... *H04W 4/02* (2013.01); *H04B 17/318* (2015.01); *H04W 24/10* (2013.01); *H04W 52/36* (2013.01)

(58) Field of Classification Search
  CPC ....... H04W 4/02; H04W 4/023; H04W 4/028; H04W 4/04; H04W 4/043; H04W 4/046
  See application file for complete search history.

(56) References Cited

U.S. PATENT DOCUMENTS

| 8,745,177 | B1 | 6/2014 | Kazerani et al. |
|---|---|---|---|
| 2011/0009135 | A1 | 1/2011 | Roskowski et al. |
| 2011/0281583 | A1 | 11/2011 | Hole |
| 2012/0015649 | A1 | 1/2012 | Li et al. |
| 2012/0136623 | A1 | 5/2012 | Edge et al. |
| 2012/0202517 | A1 | 8/2012 | Edge et al. |
| 2012/0218075 | A1 | 8/2012 | Hill |
| 2012/0315895 | A1 | 12/2012 | Jovanovic et al. |
| 2014/0045505 | A1 | 2/2014 | Henry et al. |
| 2014/0080504 | A1 | 3/2014 | De Mont et al. |
| 2014/0221019 | A1 | 8/2014 | Edge et al. |

(Continued)

OTHER PUBLICATIONS

"Notice of Allowance", issued in parent patent application U.S. Appl. No. 14/507,425; dated Aug. 13, 2015.
Notice of Allowance, issued in related U.S. Appl. No. 14/519,452, dated Apr. 12, 2016, Publisher: USPTO, Published in: US.

(Continued)

*Primary Examiner* — Nam Huynh
(74) *Attorney, Agent, or Firm* — Kaplan Breyer Schwarz & Ottesen, LLP

(57) ABSTRACT

A technique for providing a location estimate of a mobile station, with increased accuracy. An unenhanced estimate of the location of a target mobile station is first obtained. A portable transmitter is then situated in an initial geographic area of interest defined by the unenhanced estimate. The portable transmitter is then tuned to transmit on a particular neighbor base station frequency being reported by the mobile station. When the portable transmitter is moved close enough to the target mobile station, the mobile station stops reporting the neighbor to the mobile's wireless telecommunications network, on account of the interference introduced by the portable transmitter being on that frequency. The estimated distance from the portable transmitter to the target mobile station depends on the transmit signal strength used by the portable transmitter. By considering these details, an enhanced estimate of the location of the mobile station can then be deduced.

20 Claims, 15 Drawing Sheets

(56) References Cited

U.S. PATENT DOCUMENTS

| | | |
|---|---|---|
| 2014/0248908 A1 | 9/2014 | Etchegoyen |
| 2014/0274149 A1 | 9/2014 | Alfalujah et al. |
| 2015/0092746 A1 | 4/2015 | Jang et al. |
| 2015/0148055 A1* | 5/2015 | Alles ................. G01S 5/0036 455/456.1 |
| 2015/0312840 A1 | 10/2015 | Kazmi et al. |

OTHER PUBLICATIONS

Office Action, issued in related U.S. Appl. No. 14/519,452, dated May 12, 2015, Publisher: USPTO, Published in: US.

Office Action, issued in related U.S. Appl. No. 14/519,452, dated Aug. 21, 2015, Publisher: USPTO, Published in: US.

Office Action, issued in related U.S. Appl. No. 14/519,452, dated Dec. 9, 2015, Publisher: USPTO, Published in: US.

* cited by examiner

ESTIMATING PROXIMITY TO A MOBILE STATION BY MANIPULATING AN INTERFERING SIGNAL

CROSS-REFERENCE TO RELATED APPLICATIONS

This application is a divisional of U.S. patent application Ser. No. 14/507,425, filed on Oct. 6, 2014, which is incorporated herein by reference.

FIELD OF THE INVENTION

The invention relates to radio navigation in general, and, more particularly, to generating an accurate estimate of the location of a mobile station.

BACKGROUND

FIG. 1 depicts a diagram of the salient components of wireless telecommunications system 100 in accordance with the prior art. Wireless telecommunications system 100 comprises: mobile station 101, wireless base stations 102-1, 102-2, and 102-3, wireless switching center 111, assistance server 112, and location client 113. Wireless telecommunications system 100 provides wireless telecommunications service to all of geographic region 120, in well-known fashion.

The salient advantage of wireless telecommunications over wireline telecommunications is the mobility that is afforded to the user of the mobile station. On the other hand, the salient disadvantage of wireless telecommunications lies in that fact that because the mobile station is mobile, an interested party might not be able to readily ascertain the location of the mobile station.

Such interested parties might include both the user of the mobile station and remote parties. There are a variety of reasons why the user of a mobile station might be interested in knowing his or her location. For example, the user might be interested in telling a remote party where he or she is or the user might seek advice in navigation.

In addition, there are a variety of reasons why a remote party might be interested in knowing the location of the user. For example, the recipient of an emergency call (e.g., E-911) from a user might be interested in knowing the location of the mobile station so that emergency services vehicles can be dispatched to the user.

There are many techniques in the prior art for estimating the location of a mobile station. The common theme to these techniques is that location of the mobile station is estimated based on the electromagnetic (e.g., radio, etc.) signals—in one form or another—that are processed (i.e., transmitted or received) by the mobile station.

In accordance with one family of techniques, the location of a mobile station is estimated based on the transmission range of the base stations with which it is communicating. Because the range of a base station is known to be N meters, this family of techniques provides an estimate for the location that is generally accurate to within N meters. A common name for this family of techniques is "cell identification" or "cell ID." The principal disadvantage of the family of cell ID techniques is that there are many applications for which the accuracy of the estimate for the location it generates is insufficient.

In accordance with a second family of techniques, the location of a mobile station is estimated by analyzing the angle of arrival or time of arrival of the signals transmitted by the mobile station. A common, if somewhat inaccurate, name for this family of techniques is called "triangulation." The principal disadvantage of the triangulation techniques is that there are many applications for which the accuracy of the estimate for the location it generates is insufficient.

In accordance with a third family of techniques, the location of a mobile station is estimated by a receiver in the mobile station that receives signals from satellites in orbit. A common name for this family of techniques is "GPS." The principal advantage of the GPS techniques is that when it works, the estimate for the location can be accurate to within meters. The GPS techniques are disadvantageous in that they do not work consistently well indoors, in heavily-wooded forests, or in urban canyons.

In accordance with a fourth family of techniques, the location of a mobile station is estimated by pattern matching one or more location-dependent traits of one or more electromagnetic signals that are processed (i.e., transmitted and/or received) by the mobile station. Common names for this family of techniques include "Wireless Location Signatures," "RF Pattern Matching," and "RF Fingerprinting."

The basic idea is that some traits of an electromagnetic signal remain (more or less) constant as a signal travels from a transmitter to a receiver (e.g., frequency, etc.) and some traits change (e.g., signal strength, relative multi-path component magnitude, propagation delay, etc.). A trait that changes is considered a "location-dependent" trait. Each location can be described or associated with a profile of one or more location-dependent traits of one or more electromagnetic signals. A mobile station at an unknown location can observe the traits and then attempt to ascertain its location by comparing the observed traits with a database that correlates locations with expected or predicted traits.

There are various modifications that can be made to the basic Wireless Location Signatures technique to improve the accuracy of the estimate for the location. The principal advantage of the Wireless Location Signatures technique is that it is highly accurate and works well indoors, in heavily wooded forests, and in urban canyons.

At least some of these techniques are sufficiently accurate to satisfy the requirements of current public safety applications such as E-911. There are, however, other applications for which these techniques are not sufficiently accurate to satisfy the requirements thereof. For example, some law enforcement applications might require the capability to determine a particular hotel room in which a kidnapper is hiding with a victim. Similarly, a person might need to be located to within a specific apartment, vehicle, or seat in a stadium or venue.

What is needed is a technique that provides a higher level of accuracy of location estimation for certain applications than what is achievable with at least some techniques in the prior art.

SUMMARY OF THE INVENTION

The present invention enables a more accurate estimate of the location of a mobile station than that available through at least some techniques in the prior art.

In order to locate a mobile station with more accuracy and to a smaller resolution, a method and system are disclosed herein, in which one or more portable transmitters are deployed at known locations and transmit signal strengths, and are administered by a centralized intercept server. In accordance with the illustrative embodiment of the present invention, the mobile station is located by i) configuring one or more of the portable transmitters to interfere with the mobile station's ability to decode the control channel of a base station that the mobile is currently measuring and reporting as a neighbor base station and ii) deducing each portable transmitter's proximity to the mobile by analyzing the transmitter power required to cause the mobile to stop reporting the neighboring base station.

The disclosed technique is based on the following observation made by the inventor. In order to enable the mobility of mobile stations in a Global System for Mobile Communications (GSM) system, each mobile station periodically reports the signal strength of the six strongest control channels from neighboring base stations whose base station identifier—that is, the base station identity code, or "BSIC"—the mobile station is able to decode. From the perspective of the wireless network that provides telecommunications service to the mobile station, these measurement reports enable the wireless network to decide which base station to hand off the call to, if the signal from the serving base station handling the call becomes too weak. Because these neighboring base stations are not currently involved in handling the call, the inventor observed that disrupting the mobile station's ability to decode one or more of their representative identifiers does not interfere with the call itself. Accordingly, the introduced signal or signals can be used to achieve the aforementioned effects in the measurement reports for the purpose of more accurately locating the mobile station, without alerting the call participants to an attempt to locate the mobile station.

The operation of the disclosed technique is summarized here. An initial, unenhanced estimate of the location of a target mobile station is first obtained. This unenhanced estimate is intended to define an initial geographic area of interest and can be obtained through a prior-art technique of location estimation. A portable transmitter disclosed herein is then moved to that initial geographic area of interest. The portable transmitter comprises a transmitter that is tunable to one or more of the neighbor base station frequencies that are being reported by the mobile station—or to any frequency and/or timeslot corresponding to the transmission parameters of the neighbor base station control channels. The transmit signal strength of the portable transmitter is adjustable as well. The portable transmitter is then instructed to transmit an interfering signal at a predetermined frequency and signal strength.

When the portable transmitter gets close enough to the target mobile station, the mobile station stops reporting the neighbor frequency signal to the wireless telecommunications network serving the mobile, because of the interference. The distance from the portable transmitter to the target mobile station depends on the transmit signal strength used by the portable transmitter. It is from the information being reported in the measurement reports as the result of the aforementioned changes to the signals being detected, that an enhanced location estimate of the mobile station can be deduced.

As the portable transmitter begins to hone in on the location of the target mobile station, the transmit power of the portable transmitter can be lowered in order to reduce the distance at which the disruption takes place. This also has the salutary effect of causing the least disruptive local interference to other mobile stations (and users) in the area. The transmission power control of the portable transmitter can be under the command and control of a control center, comprising the controlling intercept server, which communicates with the portable transmitter and with other like counterparts in the geographic region of the mobile.

The operator who is controlling the portable transmitter, or the portable transmitter itself, receives active feedback on what neighbor base stations, either mimicked or actual, are being reported as the portable transmitter moves around the designated geographic area of interest. This is achieved by re-transmitting the measurements being reported to the wireless network by the targeted mobile station or by transmitting the geo-location of the portable transmitter to the control center where the mobile station reports are being monitored.

In an area of long-term high interest, such as an airport or railroad terminal, a number of such portable transmitters can be permanently installed with their channel selection and transmit power remotely controlled from the control center. With such an installation, it is possible to locate a call of interest accurately in the area covered by the installation without alerting the active-call participants to the location attempt. In this implementation, the locations of the transmitting portable transmitters are determined accurately ahead of time and then fixed, and the localization is achieved through selectively activating certain portable transmitters and through adjusting the transmit signal strengths. Multiple transmitting portable transmitters can be used simultaneously, if tuned to different channels being reported by the mobile station, as long as they only locally interfere as described earlier.

The disclosed technique provides a way for delivering more accurate mobile station location estimates than can be achieved by at least some prior-art techniques, by incorporating i) real-time control of the local radio-frequency (RF) environment and ii) feedback from the mobile station measurement reports. Thus, a smaller geographic area is identified for the target mobile station, relative to the initial geographic area of interest that was determined through the prior-art location methods and referred to earlier.

In accordance with the illustrative embodiment, wireless telecommunications service is provided to a mobile station in accordance with a set of standards comprising Global System for Mobile Communications (GSM). After reading this disclosure, however, it will be clear to those skilled in the art how to make and use alternative embodiments of the present invention that operate in accordance with one or more other telecommunications standards.

An illustrative method comprises: receiving, by a server computer, a measurement report generated by a mobile station; deducing, by the server computer, a degree of proximity, $P_T$, of i) a first transmitter that transmits a first signal at a first radio frequency, to ii) the mobile station, based on whether signal-strength information for a second signal that is being transmitted by a source other than the first transmitter and at the first radio frequency, is absent from the measurement report because of the first signal being transmitted; and generating, by the server computer, a location estimate of the mobile station based on the deduced degree of proximity, $P_T$, of the first transmitter to the mobile station.

Another illustrative method comprises: increasing, according to a series of steps, the transmit strength of a first signal transmitted by a first transmitter at a first radio frequency; and receiving, by a server computer, a series of measurement reports generated by a mobile station; correlating, by the server computer, the series of steps of increased transmit strength with the series of received measurement reports, in order to determine when signal-strength information corresponding to a second signal becomes absent from the series of received measurement reports, wherein the second signal is being transmitted by a source other than the first transmitter and at the first radio frequency; and generating, by the server computer, a location estimate of the mobile station based on the transmit strength at which the signal-strength information for the second signal becomes absent.

Still another illustrative method comprises: decreasing, according to a series of steps, the transmit strength of a first signal transmitted by a first transmitter at a first radio frequency; and receiving, by a server computer, a series of measurement reports generated by a mobile station; correlating, by the server computer, the series of steps of decreased transmit strength with the series of received measurement reports, in order to determine when signal-strength information corresponding to a second signal becomes present in the series of received measurement reports, wherein the second signal is being transmitted by a source other than the first transmitter and at the first radio frequency; and generating, by the server computer, a location estimate of the mobile station based on the transmit strength at which the signal-strength information for the second signal becomes present.

An illustrative apparatus comprises: a receiver configured to receive a measurement report generated by a mobile station; and a processor configured to a) deduce a degree of proximity, $P_T$, of i) a first transmitter that transmits a first signal at a first radio frequency, to ii) the mobile station, based on whether signal-strength information for a second signal that is being transmitted by a source other than the first transmitter and at the first radio frequency, is absent from the measurement report because of the first signal being transmitted, and b) generate a location estimate of the mobile station based on the deduced degree of proximity, $P_T$, of the first transmitter to the mobile station.

An illustrative system comprises: a transmitter configured to transmit a first signal at a first radio frequency, increasing, according to a series of steps, the transmit strength of the transmitted first signal; and a server computer configured to a) receive a series of measurement reports generated by a mobile station, b) correlate the series of steps of increased transmit strength with the series of received measurement reports, in order to determine when signal-strength information corresponding to a second signal becomes absent from the series of received measurement reports, wherein the second signal is being transmitted by a source other than the first transmitter and at the first radio frequency, and c) generate a location estimate of the mobile station based on the transmit strength at which the signal-strength information for the second signal becomes absent.

Another illustrative system comprises: a transmitter configured to transmit a first signal at a first radio frequency, decreasing, according to a series of steps, the transmit strength of the transmitted first signal; and a server computer configured to a) receive a series of measurement reports generated by a mobile station, b) correlate the series of steps of decreased transmit strength with the series of received measurement reports, in order to determine when signal-strength information corresponding to a second signal becomes present in the series of received measurement reports, wherein the second signal is being transmitted by a source other than the first transmitter and at the first radio frequency, and c) generate a location estimate of the mobile station based on the transmit strength at which the signal-strength information for the second signal becomes present.

DETAILED DESCRIPTION

For the purposes of the present specification, the following terms and their inflected forms are defined as follows:

a. A "location L" is defined as any one of a zero-dimensional point, a finite one-dimensional path segment, a finite two-dimensional surface area, or a finite three-dimensional volume. Thus, a location can be described, for example and without limitation, by a street address, geographic coordinates ("geo-location"), a perimeter, a virtual perimeter surrounding a geographic area (i.e., a "geofence"), a cell ID of a wireless network, or an enhanced cell ID in a wireless network.

b. A "mobile station" is defined as an apparatus that:
   receives signals from another apparatus without a wire, or
   transmits signals to another apparatus without a wire, or
   both (i) and (ii).
   As is well known to those skilled in the art, a mobile station is also commonly referred to by a variety of alternative names such as and without limitation: a wireless transmit/receive unit (WTRU), user equipment (UE), a wireless terminal, a fixed or mobile subscriber unit, a pager, a cellular telephone, a smart-phone, a personal digital assistant (PDA), a computer, or any other type of device capable of operating in a wireless environment.

c. A "degree of proximity $P_T$" is defined as the amount, level, or extent of nearness in space of a transmitter to a recited second apparatus, such as a mobile station.

Other terms may also be defined elsewhere herein.

Overview—

Figure 1:
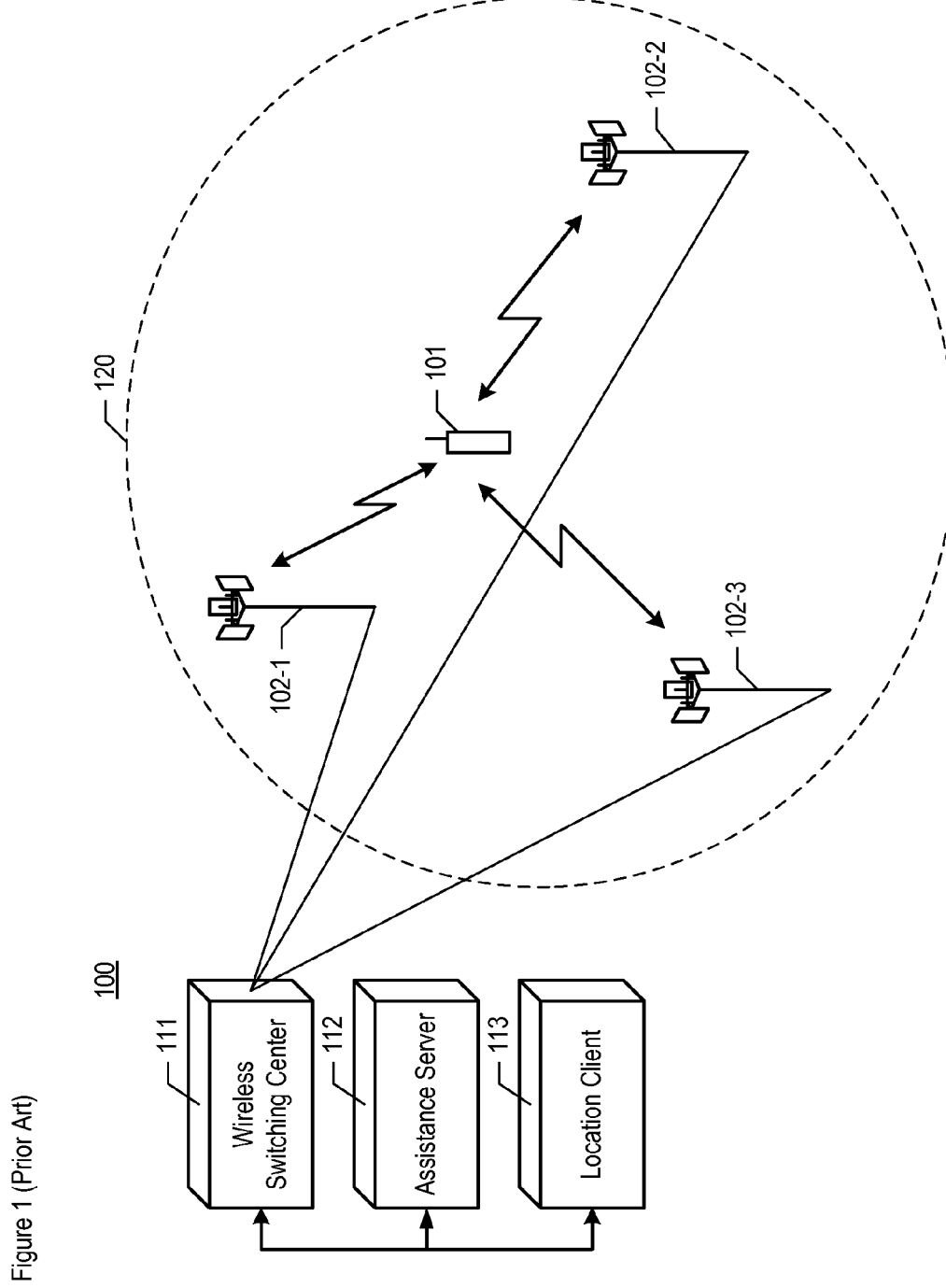
FIG. 1 depicts a diagram of the salient components of wireless telecommunications system 100 in accordance with the prior art.
Figure 2:
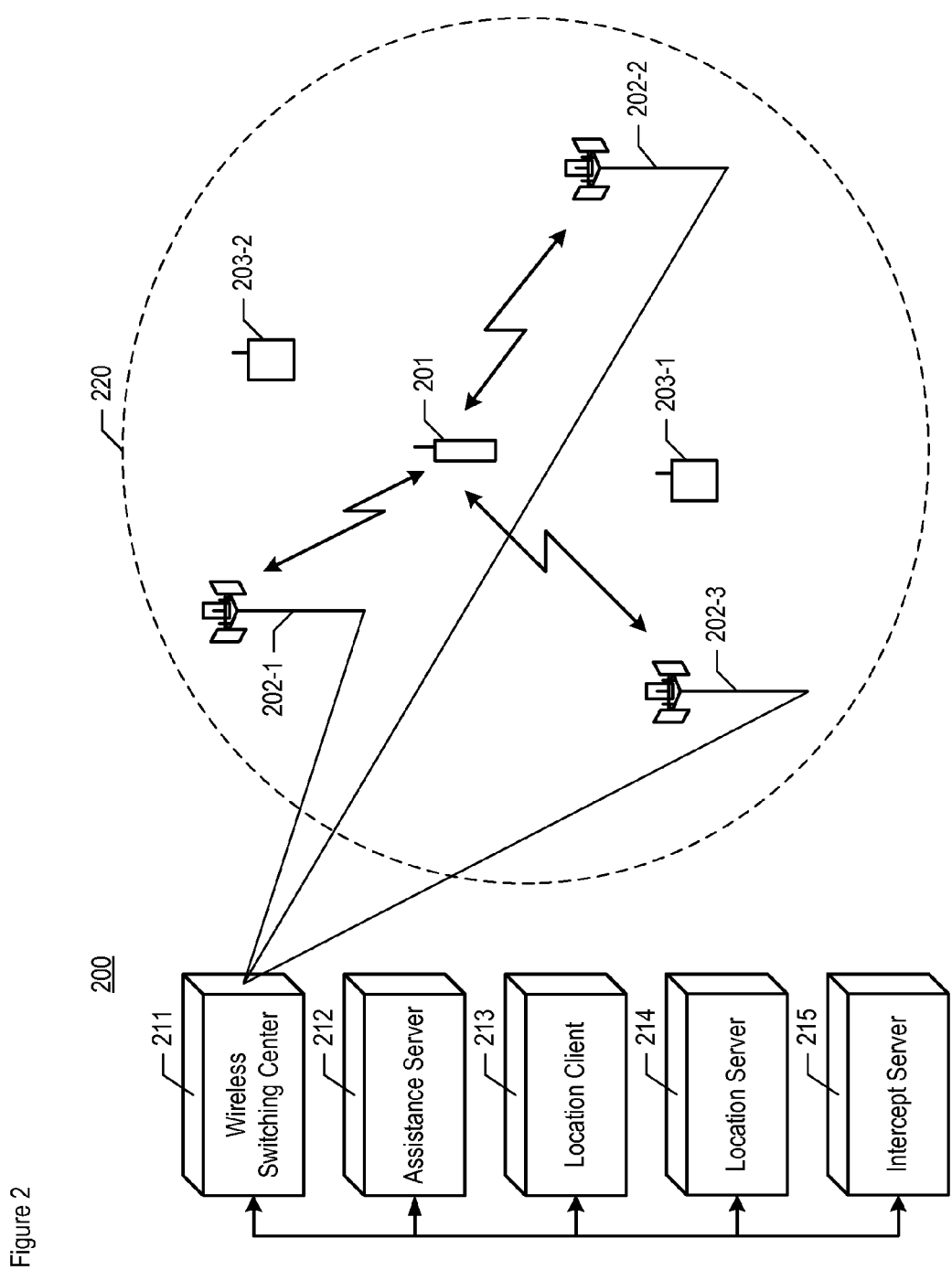
FIG. 2 depicts a diagram of the salient components of wireless telecommunications system 200 in accordance with an illustrative embodiment of the present invention.

FIG. 2 depicts a diagram of the salient components of wireless telecommunications system 200 in accordance with an illustrative embodiment of the present invention. Wireless telecommunications system 200 comprises: mobile station 201, wireless base stations 202-1, 202-2, and 202-3, portable transmitters 203-1 and 203-2, wireless switching center 211, assistance server 212, location client 213, location server 214, and intercept server 215, which are interrelated as shown. The illustrative embodiment provides wireless telecommunications service to all of geographic region 220, estimates the location of mobile station 201 within geographic region 220 at various times, and uses those estimates in a location-based application.

In accordance with the illustrative embodiment, wireless telecommunications service is provided to mobile station 201 in accordance with a set of standards comprising Global System for Mobile Communications (GSM). After reading this disclosure, however, it will be clear to those skilled in the art how to make and use alternative embodiments of the present invention that operate in accordance with one or more other telecommunications standards (e.g., Universal Mobile Telecommunications System "UMTS", Long Term Evolution "LTE", CDMA-2000, IS-136 TDMA, IS-95 CDMA, 3G Wideband CDMA, IEEE 802.11 Wi-Fi, 802.16 WiMax, Bluetooth, etc.) in one or more frequency bands. For example, the BCCH and BSIC in GSM described herein have analogies in other standards, such as the common pilot channel (CPICH) and scrambling code in UMTS, respectively.

Mobile station 201 comprises the hardware and software necessary to be GSM-compliant and to perform the processes described below and in the accompanying figures. For example and without limitation, mobile station 201 is capable of:

a. measuring one or more location-dependent traits of each of one of more electromagnetic signals (e.g., transmitted by wireless base stations 202-1, 202-2, and 202-3, etc.) and of reporting the measurements to location server 214 (e.g. in the form of Network Measurement Reports [NMR], etc.), and b. transmitting one or more signals and of reporting the transmission parameters of those signals to location server 214.

Mobile station 201 is mobile and can be at any location within geographic region 220 at any time. Although wireless telecommunications system 200 comprises only one mobile station, it will be clear to those skilled in the art, after reading this disclosure, how to make and use alternative embodiments of the present invention that comprise any number of mobile stations.

Each of wireless base stations 202-1, 202-2, and 202-3 comprises the hardware and software necessary to be GSM-compliant and to perform the processes described below and in the accompanying figures. For example and without limitation, each wireless base station is capable of:

a. measuring one or more location-dependent traits of each of one of more electromagnetic signals (transmitted by mobile station 201) and of reporting the measurements to location server 214, and b. transmitting one or more signals and of reporting the transmission parameters of those signals to location server 214.

Wireless base stations 202-1, 202-2, and 202-3 communicate with mobile station 201 via radio with wireless switching center 211, in well-known fashion. As is well known to those skilled in the art, base stations are also commonly referred to by a variety of alternative names such as access points, cell sites, base transceiver stations (BTS), nodes (e.g., Node-B, eNode-B, etc.), network interfaces, and so on. Furthermore, there may be one or more elements, which are not depicted in FIG. 2, interposed between each base station and wireless switching center 211, such as a base station controller (BSC), or between each base station and mobile station 201, or both.

Although the illustrative embodiment comprises three base stations, it will be clear to those skilled in the art, after reading this disclosure, how to make and use alternative embodiments of the present invention that comprise any number of base stations.

In accordance with the illustrative embodiment of the present invention, wireless base stations 202-1, 202-2, and 202-3 are terrestrial, immobile, and within geographic region 220. It will be clear to those skilled in the art, after reading this disclosure, how to make and use alternative embodiments of the present invention in which some or all of the base stations are airborne, marine-based, or space-based, regardless of whether or not they are moving relative to the Earth's surface, and regardless of whether or not they are within geographic region 220.

Each portable transmitter 203-$m$, wherein m has a value of 1 or 2 as depicted, comprises the hardware and software necessary to perform the processes described below and in the accompanying figures. Portable transmitter 203-$m$ is further described below and in FIG. 3.

Portable transmitter 203-$m$ is portable and, in accordance with an illustrative embodiment of the present invention, can be at any location within geographic region 220 at any time. Transmitter 203-$m$ is provided in an enclosure that can be carried, such as a briefcase, a backpack, and so on, for example and without limitation. In some embodiments of the present invention, transmitter 203-$m$ is part of a vehicle that is dispatched for the purpose of locating mobile station 201.

Alternatively, portable transmitter 203-$m$ can be fixed at a particular location, rather than being moved during the course of locating mobile station 201. In some of these embodiments in which it is fixed in position, portable transmitter 203-$m$ can constitute equipment that is, in fact, not portable.

Although there are two portable transmitters depicted (i.e., 203-1 and 203-2), it will be clear to those skilled in the art, after reading this disclosure, how to make and use alternative embodiments of the present invention that comprise any number of portable transmitters. That is, parameter m can have a value in the range of 1 through M, wherein M can be any positive integer. Furthermore, when multiple portable transmitters are used, the portable transmitters can embody different forms with respect to each other (e.g., briefcase, backpack, in-vehicle, fixed in position, etc.).

Wireless switching center 211 comprises a switch that orchestrates the provisioning of telecommunications service to mobile station 201 and the flow of information to and from location server 214 and intercept server 215, as described below and in the accompanying figures. As is well known to those skilled in the art, wireless switching centers are also commonly referred to by other names such as mobility management centers (MME), mobile switching centers (MSC), mobile telephone switching offices (MTSO), routers, and so on.

Although the illustrative embodiment comprises one wireless switching center, it will be clear to those skilled in the art, after reading this disclosure, how to make and use alternative embodiments of the present invention that comprise any number of wireless switching centers. For example, when a mobile station can interact with two or more wireless switching centers, the wireless switching centers can exchange and share information that is useful in estimating the location of the mobile station.

In accordance with the illustrative embodiment, all of the base stations servicing mobile station 201 are associated with wireless switching center 211. It will be clear to those skilled in the art, after reading this disclosure, how to make and use alternative embodiments of the present invention in which any number of base stations are associated with any number of wireless switching centers.

Assistance server 212 comprises hardware and software that are capable of performing the processes described below and in the accompanying figures. In general, assistance server 212 generates GPS assistance data for mobile station 201 and possibly other devices (e.g., portable transmitter 203-$m$, etc.), to aid in the acquisition and processing of GPS ranging signals from a GPS constellation. In accordance with the illustrative embodiment, assistance server 212 is a separate physical entity from location server 214. However, it will be clear to those skilled in the art, after reading this disclosure, how to make and use alternative embodiments of the present invention in which assistance server 212 and/or one or more other depicted elements share hardware, software, or both. It will also be clear to those skilled in the art, after reading this disclosure, how to make and use alternative embodiments of the present invention in which assistance server 212 is not used at all (e.g., when GPS data is not used).

Location client 213 comprises hardware and software that uses the estimate of the location of mobile station 201—provided by location server 214—in a location-based application, as described below and in the accompanying figures. In some embodiments of the present invention, client 213 uses one or more enhanced location estimates generated by intercept server 215, either instead of or in addition to the estimate provided by server 214.

Location server 214 comprises hardware and software that generates one or more estimates of the location of mobile station 201 based on a technique that uses wireless location signatures. In some alternative embodiments of the present invention, server 214 uses a different technique to provide unenhanced location estimates that are obtained without using any portable transmitter 203-$m$. It will be clear to those skilled in the art, after reading this disclosure, how to make and use location server 214. Furthermore, although location server 214 is depicted in FIG. 2 as physically distinct from wireless switching center 211, it will be clear to those skilled in the art, after reading this disclosure, how to make and use alternative embodiments of the present invention in which location server 214 is wholly or partially integrated with wireless switching center 211, is wholly or partially integrated with one or more of the other depicted elements, or both.

Intercept server 215 is an apparatus that comprises the hardware and software necessary to perform the processes described below and in the accompanying figures, including generating one or more enhanced location estimates of mobile station 201. The intercept server is capable of receiving one or more signal strength measurements that are made by mobile station 201, obtaining one or more initial location estimates from location server 214, and communicating with one or both of portable transmitters 203-1 and 203-2. Intercept server 215 is illustratively a server computer and is further described below and in FIG. 4.

Although intercept server 215 is depicted in FIG. 2 as physically distinct from location server 214, it will be clear to those skilled in the art, after reading this disclosure, how to make and use alternative embodiments of the present invention in which intercept server 215 is wholly or partially integrated with location server 214, is wholly or partially integrated with one or more of the other depicted elements, or both.

In accordance with the illustrative embodiment, wireless switching center 211, assistance server 212, location client 213, location server 214, and intercept server 215 communicate with one another with via a local area network. However, it will be clear to those skilled in the art, after reading this disclosure, how to make and use alternative embodiments of the present invention in which one or more of the aforementioned elements communicate with one or more of the other elements via a different network such as, for example, the Internet, the Public Switched Telephone Network (PSTN), a wide area network, and so on.

Portable Transmitter 203-$m$—

Figure 3:
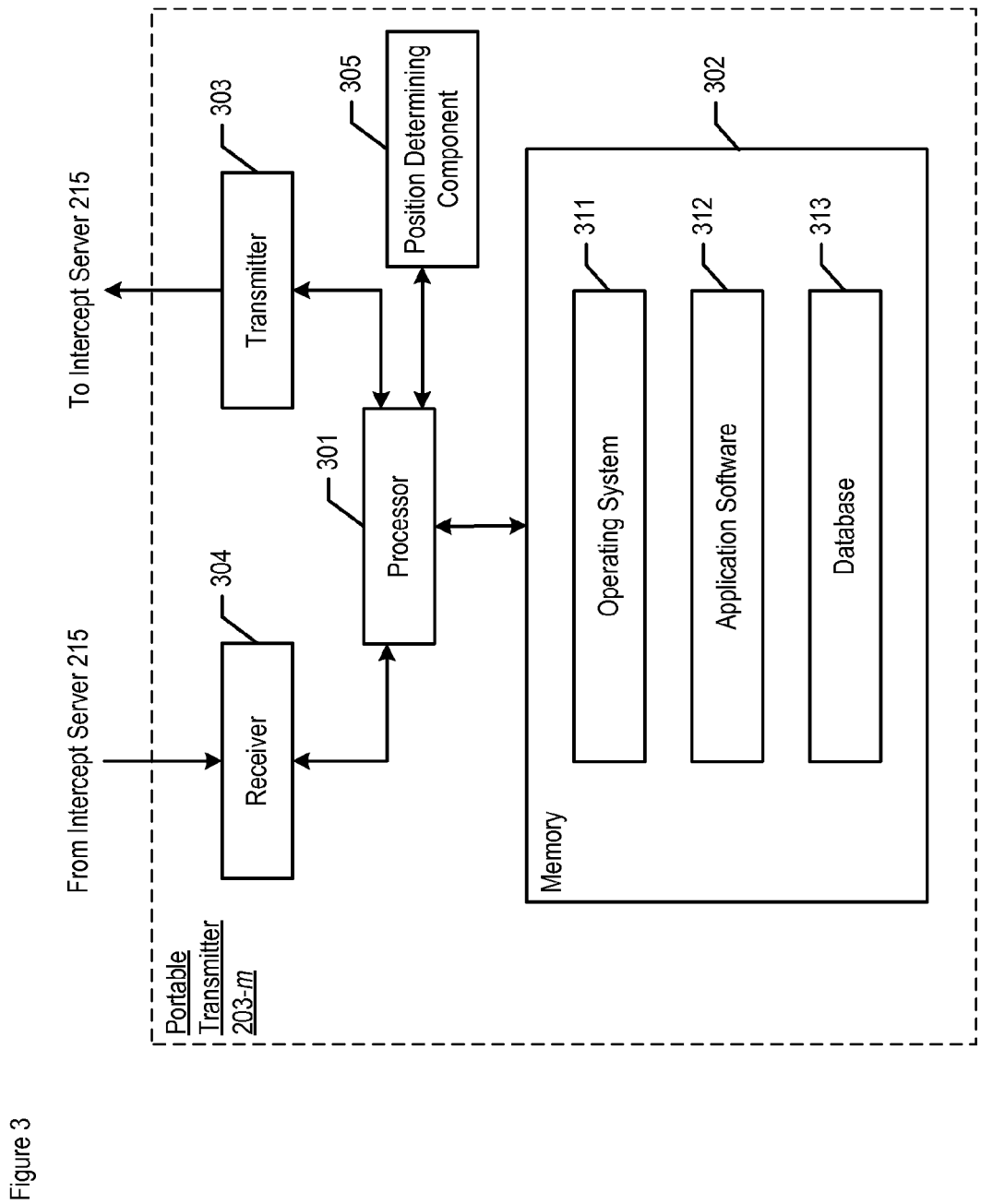
FIG. 3 depicts a block diagram of the salient components of portable transmitter 203-*m* in accordance with an illustrative embodiment.

FIG. 3 depicts a block diagram of the salient components of portable transmitter 203-$m$ in accordance with an illustrative embodiment. Portable transmitter 203-$m$ comprises: processor 301, memory 302, transmitter component 303, receiver component 304, and position determining component 305, which are interconnected as shown.

Processor 301 is a general-purpose processor that is configured to execute operating system 311 and application software 312, and of populate, amend, use, and manage database 313, as described in detail below and in the accompanying figures. For the purposes of this specification, a "processor" is defined as one or more computational elements, whether co-located or not and whether networked together or not. It will be clear to those skilled in the art how to make and use processor 301.

Memory 302 is non-transitory and non-volatile computer storage memory technology that is well known in the art (e.g., flash memory, etc.). Memory 302 is configured to store operating system 311, application software 312, and database 313. The operating system is a collection of software that manages, in well-known fashion, portable transmitter 203-$m$'s hardware resources and provides common services for computer programs, such as those that constitute the application software. The application software that is executed by processor 301 according to the illustrative embodiment enables portable transmitter 203-$m$ to perform the functions disclosed herein. Database 313 comprises information about the current location of portable transmitter 203-$m$; the current electromagnetic signal transmitted by portable transmitter 203-$m$, including the frequency channel and signal strength; and so on.

It will be clear to those having ordinary skill in the art how to make and use alternative embodiments that comprise more than one memory 302; or comprise subdivided segments of memory 302; or comprise a plurality of memory technologies that collectively store the operating system, application software, and database.

Transmitter component 303 is configured to transmit portable transmitter 203-$m$ to transmit an electromagnetic signal that coincides with a selectable frequency channel on the frequency band used by wireless base stations 202-1, 202-2, and 202-3. This is to enable the techniques disclosed herein for locating mobile station 201. In accordance with the illustrative embodiment of the present invention, the transmitted signal is a continuous wave (CW) signal. However, as those who are skilled in the art will appreciate after reading this specification, the transmitted signal can be another type of signal that effective in interfering with a frequency channel as defined in the GSM set of standards, or whatever set of standards applies to the wireless telecommunications network in which mobile station 201 operates. Transmitter component 303 is also capable of transmitting the signal at a predetermined transmit strength (i.e., power level) and adjusting the transmit strength.

In some embodiments, the transmitter component is further capable of transmitting portable transmitter 203-$m$'s location, as determined by component 305 below, and settings. This transmitted information can then be provided to intercept server 215, such as through an operator or through a radio receiver interconnected to server 215, for example and without limitation. In any event, it will be clear to those skilled in the art, after reading this specification, how to make and use transmitter component 303.

Receiver component 304 is configured to receive portable transmitter 203-$m$ to receive information from intercept server 215. The received information includes commands for controlling the portable transmitter such as a frequency channel on which to transmit a signal and a signal strength at which to transmit the signal. Additionally, the received information includes one or more commands that convey a direction in which to move portable transmitter 203-$m$, which direction might or might not include a position to which to move the portable transmitter. In accordance with an illustrative embodiment, receiver component 304 is configured to communicate wirelessly with the network that comprises server 215, while in some other embodiments (e.g., where fixed in position, etc.) component 304 is configured to communicate via wireline.

In some embodiments of the present invention, receiver component 304 is absent or, if present, is instead used to receive signals (e.g., voice commands, etc.) that are understandable by a person who is operating portable transmitter 203-$m$, who can then implement the received commands. In any event, it will be clear to those skilled in the art, after reading this specification, how to make and use receiver component 304.

Position determining component 305 is configured to determine and report the ground truth of the transmitter's current location. In accordance with an illustrative embodiment, component 305 utilizes GPS; however, in some other embodiments of the present invention, component 305 can utilize an inertial system or some other system of determining the ground truth of the transmitter's location, with or without GPS data. For example, in some cases a user carrying portable transmitter 203-$m$ might report the transmitter's position verbally to intercept server 215 by saying, for instance, "I am outside the door of room 719 on the 7$^{th}$ floor of the hotel."

In some embodiments of the present invention, position-determining component 305 is absent. In any event, it will be clear to those skilled in the art how to make and use position-determining component 305.

Intercept Server 215—

Figure 4:
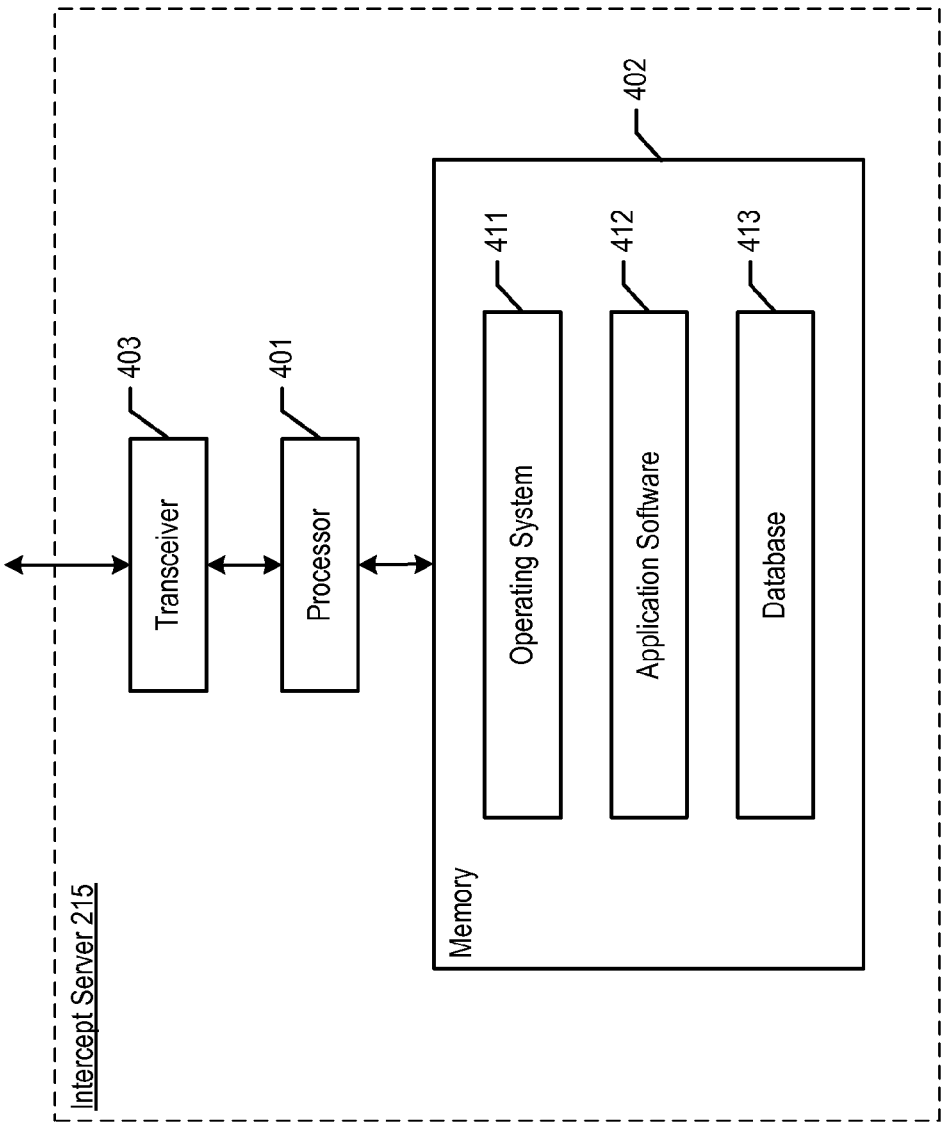
FIG. 4 depicts a block diagram of the salient components of intercept server 215 in accordance with an illustrative embodiment.

FIG. 4 depicts a block diagram of the salient components of intercept server 215 in accordance with an illustrative embodiment. Intercept server 215 comprises: processor 401, memory 402, and local-area network transmitter/receiver 403, which are interconnected as shown.

Processor 401 is a general-purpose processor that is configured to execute operating system 411 and application software 412, and of populate, amend, use, and manage database 413, as described in detail below and in the accompanying figures. For the purposes of this specification, a "processor" is defined as one or more computational elements, whether co-located or not and whether networked together or not. It will be clear to those skilled in the art how to make and use processor 401.

Memory 402 is non-transitory and non-volatile computer storage memory technology that is well known in the art (e.g., flash memory, etc.). Memory 402 is configured to store operating system 411, application software 412, and database 413. The operating system is a collection of software that manages, in well-known fashion, intercept server 215's hardware resources and provides common services for computer programs, such as those that constitute the application software. The application software that is executed by processor 401 according to the illustrative embodiment enables intercept server 215 to perform the functions disclosed herein. Database 413 comprises information about the current and past locations of each portable transmitter 203-$m$; the current and past electromagnetic signals transmitted by each portable transmitter 203-$m$, including the frequency channel and signal strength; and so on.

It will be clear to those having ordinary skill in the art how to make and use alternative embodiments that comprise more than one memory 402; or comprise subdivided segments of memory 402; or comprise a plurality of memory technologies that collectively store the operating system, application software, and database.

Transmitter/receiver (transceiver) 403 enables intercept server 215 to transmit and receive information to and from portable transmitters 203-1 and 203-2 and location server 214. In addition, transmitter/receiver 403 enables intercept server 215 to transmit information to and receive information from mobile station 201 and wireless base stations 202-1 through 202-3 via wireless switching center 211. It will be clear to those skilled in the art how to make and use transmitter/receiver 403.

Operation of the Illustrative Embodiment

Figure 5:
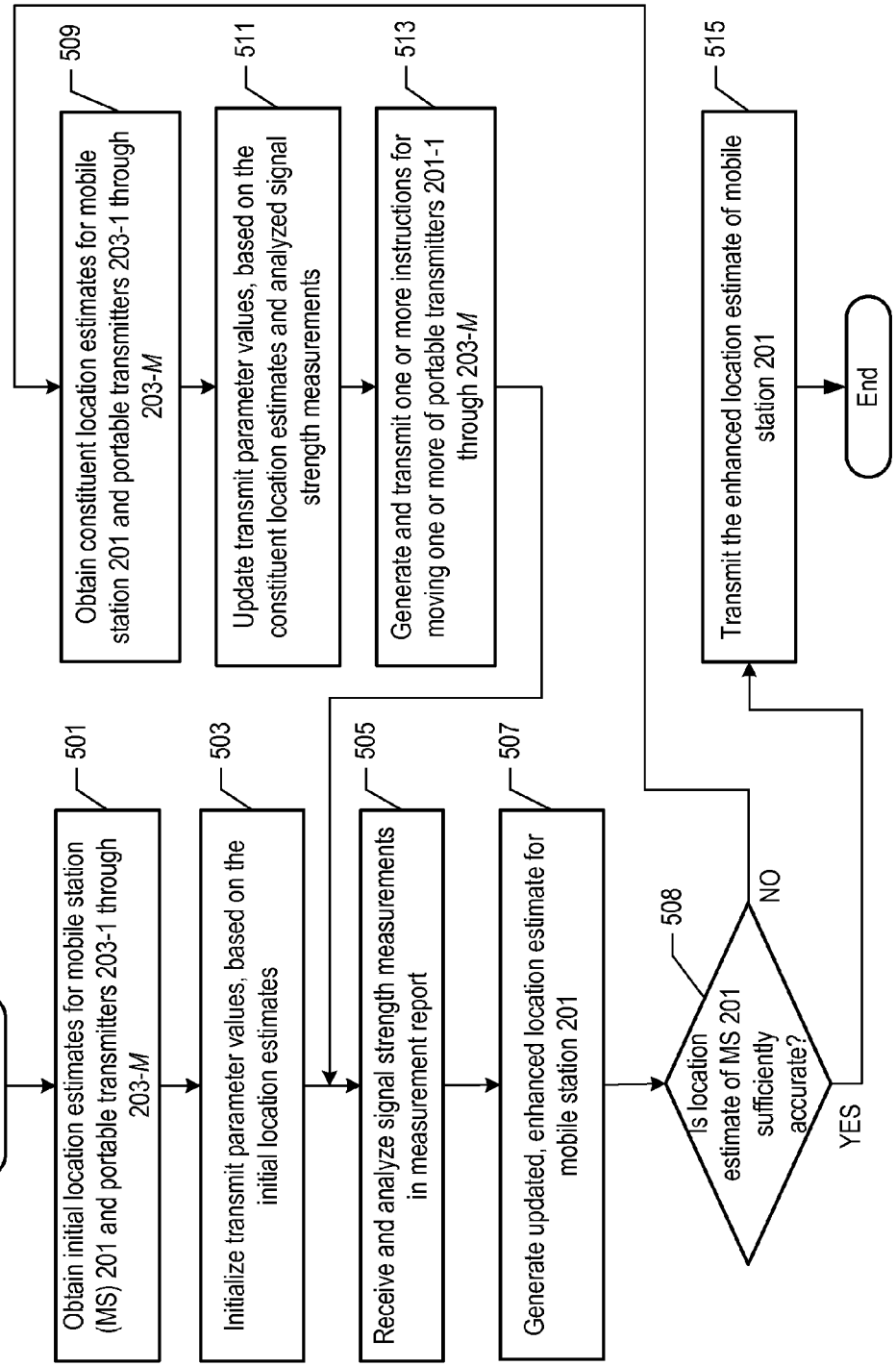
FIG. 5 depicts a flowchart of the salient processes performed in accordance with an illustrative embodiment of the present invention.

FIG. 5 depicts a flowchart of the salient processes performed in accordance with an illustrative embodiment of the present invention.

In regard to method 500, it will be clear to those having ordinary skill in the art, after reading the present disclosure, how to make and use alternative embodiments of method 500 wherein the recited operations and sub-operations are differently sequenced, grouped, or sub-divided—all within the scope of the present invention. It will be further clear to those skilled in the art, after reading the present disclosure, how to make and use alternative embodiments of method 500 wherein some of the recited operations and sub-operations are optional, are omitted, or are executed by other elements and/or systems.

At operation 501, intercept server 215 obtains initial location estimates for mobile station (MS) 201 and portable transmitters 203-1 through 203-M. Operation 501 is described below and in FIG. 9.

At operation 503, server 215 initializes transmit parameter values to be used by portable transmitters 203-1 through 203-M, based on the initial location estimates obtained at operation 501. Operation 503 is described below and in FIG. 10.

At operation 505, server 215 receives and analyzes one or more signal strength measurements, which are contained in a measurement report generated by mobile station 201 (e.g., a Network Measurement Report [NMR], etc.). Operation 505 is described below and in FIG. 11.

At operation 507, server 215 generates an updated, enhanced location estimate for mobile station 201. Operation 507 is described below and in FIG. 12.

At operation 508, if the enhanced location estimate of mobile station 201 generated at operation 507 is sufficiently accurate, control of execution proceeds to operation 515. If the location estimate is not sufficiently accurate, control of execution proceeds to operation 509. A level that constitutes sufficient accuracy can be based on the particular application of the enhanced location estimations obtained through the technique disclosed herein, for example and without limitation.

At operation 509, server 215 obtains constituent location estimates for mobile station 201 and for portable transmitters 203-1 through 203-M, which constituent estimates will be used to generate an updated, enhanced location estimate. Operation 509 is described below and in FIG. 13.

At operation 511, server 215 updates transmit parameter values to be used by portable transmitters 203-1 through 203-M, based on estimates of the current locations of the portable transmitters and on the analyzed signal strength measurements obtained at operation 505. Operation 511 is described below and in FIG. 14.

At operation 513, server 215 generates and transmits one or more instructions for moving one or more of portable transmitters 203-1 through 203-M. Operation 513 is described below and in FIG. 15.

At operation 515, server 215 transmits the location estimate of mobile station 201 to location client 213. In some embodiments of the present invention, server 215 transmits the estimate to a different device (e.g., a different server, a display, one or more of portable transmitters 203-1 through 203-M, etc.) instead of or in addition to transmitting the estimate to location client 213.

Execution of the operations is depicted in FIG. 5 as then concluding. However, as those who are skilled in the art will appreciate after reading this disclosure, execution of the operations can alternatively continue, in order to generate one or more additional location estimates of mobile station 201 (e.g., for when the mobile station is moving, etc.), or location estimates of a different mobile station, or both, for example and without limitation.

Overview of Operations—

Figure 6:
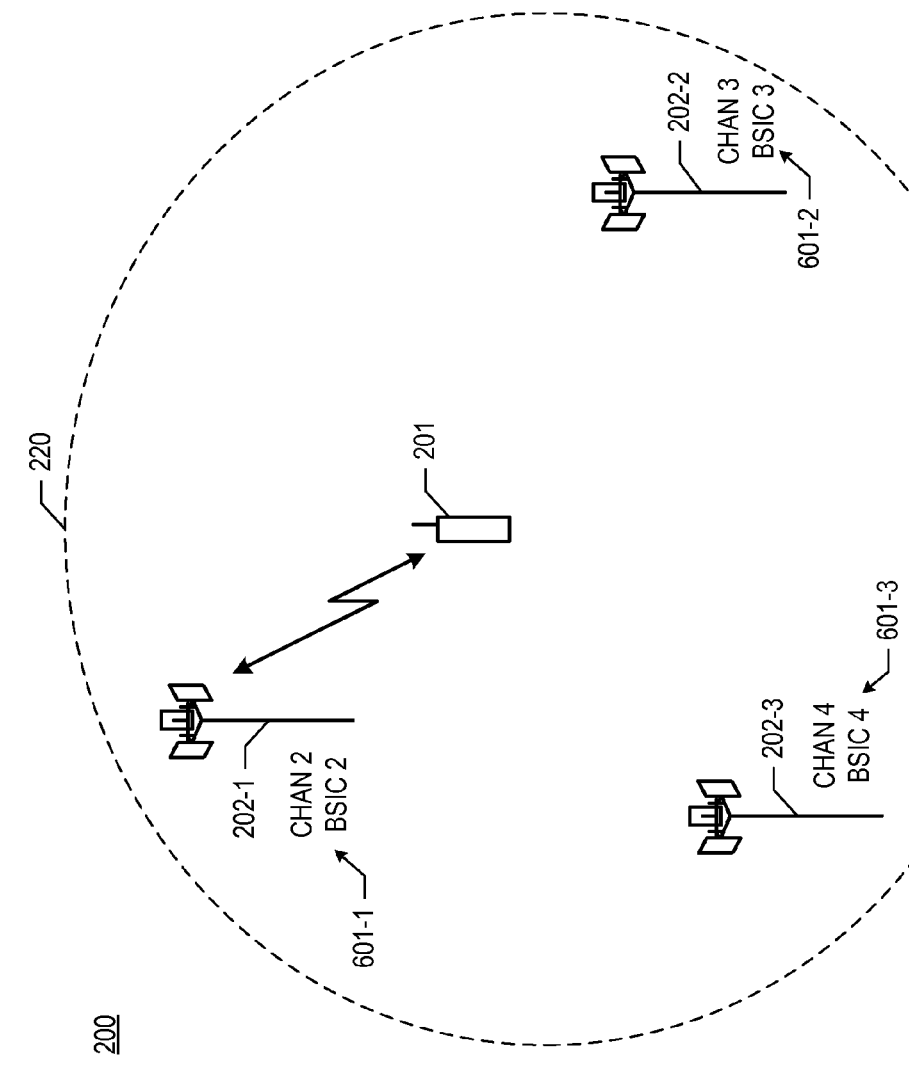
FIG. 6 depicts base stations 201-1 through 201-3 transmitting assigned BSICs on assigned frequency channels, in the course of providing wireless telecommunications service to mobile station 201.
Figure 7:
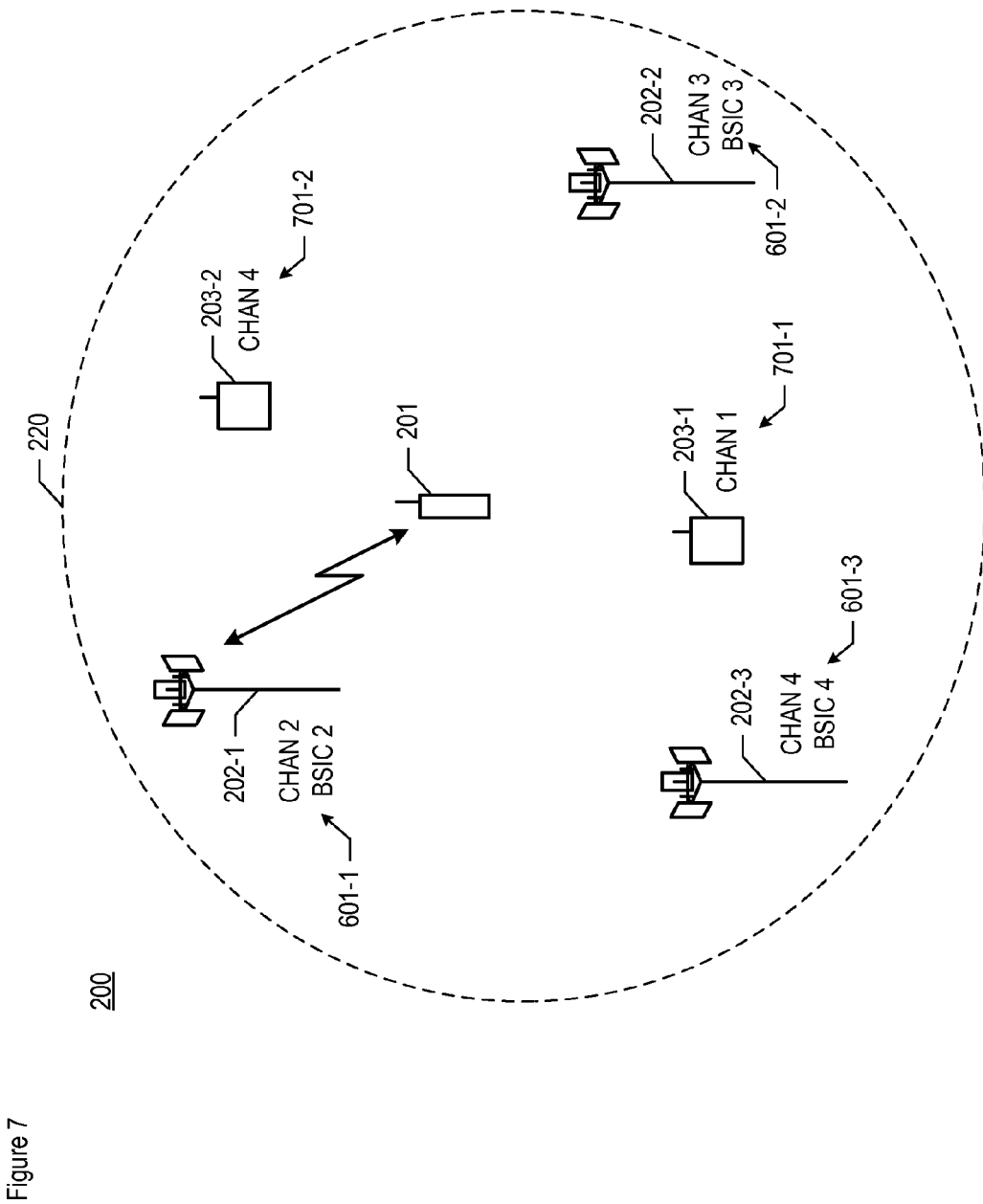
FIG. 7 depicts portable transmitters 203-1 and 203-2 transmitting signals on assigned frequency channels, in accordance with an illustrative embodiment of the present invention.
Figure 8:
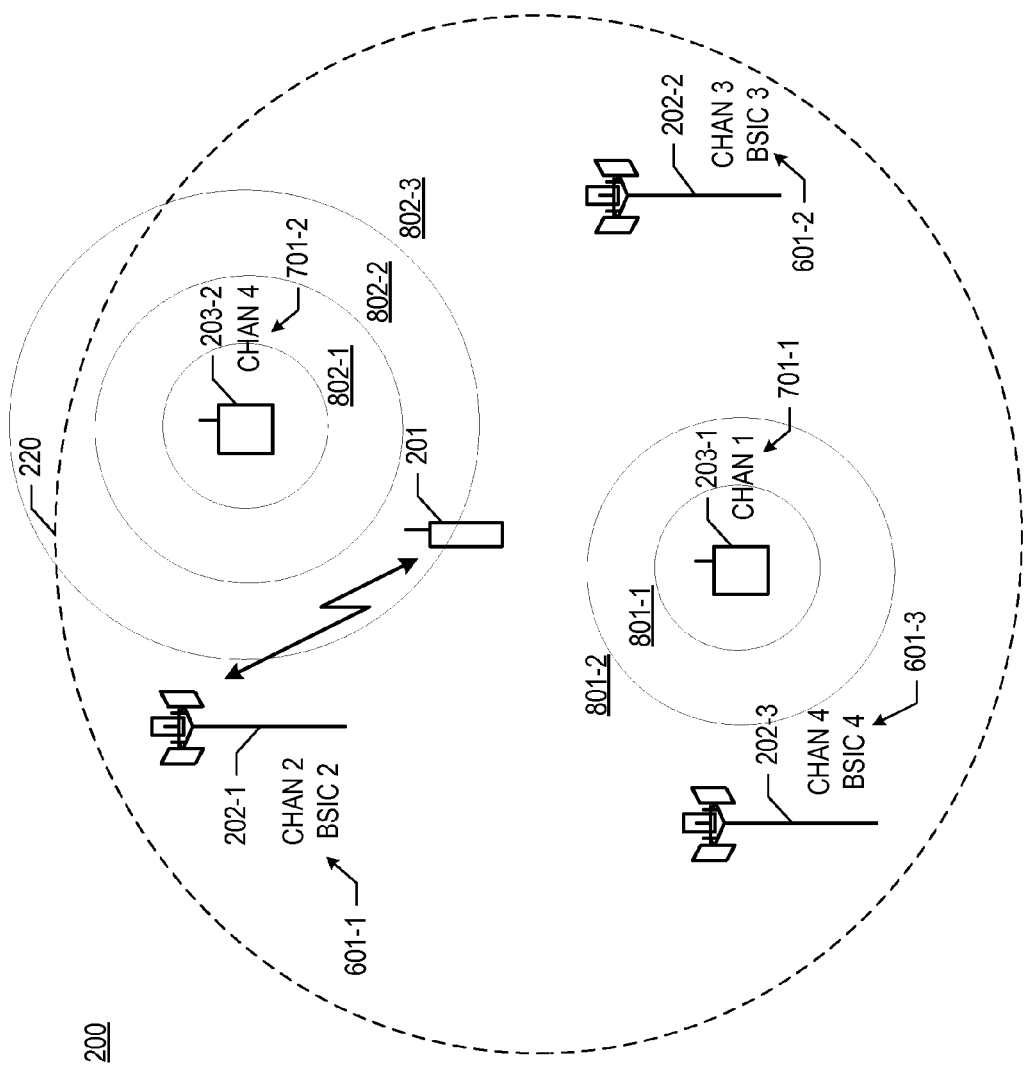
FIG. 8 depicts portable transmitters 203-1 and 203-2 adjusting their transmit strengths, in accordance with an illustrative embodiment of the present invention.

FIGS. 6 through 8 accompany a high-level description of some of the operations described below and in the remaining figures. FIG. 6 depicts a scenario in which wireless telecommunications system 200 provides wireless telecommunications service to all of geographic region 220, including to mobile station 201. In order to allow for its mobility, mobile station 201 periodically reports, in well-known fashion, the signal strength of the N strongest control channels (e.g., N equals six, etc.) from neighboring base stations whose base station identity code (BSIC) it is able to decode. In this example, serving base station 202-1 transmits a BSIC with a value of 2 on control channel 2, as part of parameter set 601-1, while neighboring base stations 202-2 and 202-3 transmit BSICs with values of 3 and 4, respectively, on control channels 3 and 4, referring to parameter sets 601-2 and 602-3, respectively.

In terms of system 200, these measurement reports enable the system, in well-known fashion, to decide which base station to hand the call off to when the signal from the base station handling the call (i.e., station 202-1) becomes too weak. Because neighboring base stations 202-2 and 202-3 are not currently involved in handling the call, disrupting the mobile station's ability to decode one or more of them would not interfere with the call and, hence, does not alert the station's user to an attempt to locate him.

Referring to FIG. 7, and in accordance with an illustrative embodiment of the present invention, intercept server 215 (not depicted) obtains an initial, unenhanced location estimate for mobile station 201, according to operation 501. Next, one or more portable transmitters, as illustrated by transmitters 203-1 and 203-2, can be sent to the mobile station's vicinity defined by the unenhanced location estimate. The portable transmitters can be tuned to a frequency channel (i.e., "CHAN") or channels that can be selected and assigned so as not to interfere with normal wireless telecommunication service.

In this scenario, transmitters 203-1 and 203-2 are assigned frequency channels 1 and 4, respectively, as parts of parameter sets 701-1 and 701-2, respectively, and in accordance with operation 503. In particular, frequency channel 4 is assigned to transmitter 203-2 because depending on where mobile station 201 is in relation to neighbor base station 202-3 and potentially-interfering portable transmitter 203-2, the mobile station will either report BSIC 4 (on CHAN 4) or not, thereby providing a clue as to the mobile station's relative location. Portable transmitters 203-1 and 203-2 each proceed to transmit a signal in accordance with the assigned frequency channel and at an initial transmit strength.

Now referring to FIG. 8, and in accordance with an illustrative embodiment of the present invention, intercept server 215 starts receiving measurement reports from mobile station 201 that contain one or more signal strength measurements of the various signal sources, in accordance with operation 505. At some point in the operation, mobile station 201 will detect the presence of the signal transmitted by portable transmitter 203-1, the signal transmitted by portable transmitter 203-2, or both signals. Based one or more signals being present, or not present, intercept server 215 can deduce a degree of proximity of one or more portable transceivers to the mobile station and generate an enhanced location estimate of mobile station 201, as described in detail later.

Before an enhanced location estimate can be determined, however, it may be necessary to adjust the transmit strengths of one or more of the portable transceivers, in accordance with operation 511. As depicted in FIG. 8, transmitter 203-1 transmits at power levels 801-1 and 801-2 at different times, and transmitter 203-2 transmits at power levels 802-1 through 802-3 at different times. The power levels that are transmitted are based on an updated, unenhanced location estimate for mobile station 201 and/or updated location estimates for portable transceivers 203-1 and 203-2, obtained in accordance with operation 509.

The transmit strength used by a portable transmitter might be increased until the mobile station can no longer decode and report the BSIC that it had been reporting. For example, the transmit strength used by portable transmitter 203-2, which is transmitting on frequency channel 4, might be increased (e.g., to power level 802-3) until mobile station 201 can no longer decode BSIC 4, which the mobile station previously had been reporting. Conversely, the transmit strength might be decreased until the mobile station is able to decode and report a BSIC that it had not been reporting at least recently. For example, the transmit strength used by portable transmitter 203-2, which is transmitting on frequency channel 4, might be decreased (e.g., from power level 802-3) until mobile station 201 is able to decode BSIC 4, which the mobile station previously had not been decoding or reporting because of interfering transmitter 203-2. This backing off from a greater signal strength can, for example, be used to get a better sense of the degree of proximity of the portable transmitter to the mobile station.

Additionally, one or both of the portable transmitters may need to be moved in order to achieve a more precise fix on the mobile station's current position. To this end, intercept server 215 can generate and transmit movement instructions to the applicable portable transmitters, in accordance with operation 513. For example and as depicted, the transmit strength corresponding to power level 802-1 is insufficient as to enable portable transmitter 203-2 to interfere with mobile station 201's ability to detect the BSIC transmitted by neighbor base station 202-3 and to exclude it from the mobile's next measurement report. Continuing with this example, intercept server 215 might then provide instructions for transmitter 203-2 to be moved closer to mobile station 201 in order to cause interference to occur. The particular direction of the movement can be determined in any of a variety of ways, such as by trial-and-error, by analyzing mobile station 201's measurement reports, and so on. A change in transmit strength of transmitter 203-2 can also be coordinated with the move; for example, the transmit strength can be decreased if the transmitter is instructed to move closer. A sufficiently accurate location estimate for mobile station 201 can be determined through an iterative process that involves one or more of the foregoing operations.

As those who are skilled in the art will appreciate after reading this specification, server 215 might have multiple portable transmitters operating at a given time or might have one portable transmitter operating at a given time. In the latter case, the portable transmitters can stay at a fixed position and increase the transmitted signal strength until a neighbor base station stops being reported, or a portable transmitter can transmit at a constant power and move around until a neighbor base station being reported, or both.

Obtaining Initial Location Estimates at Operation 501—

Figure 9:
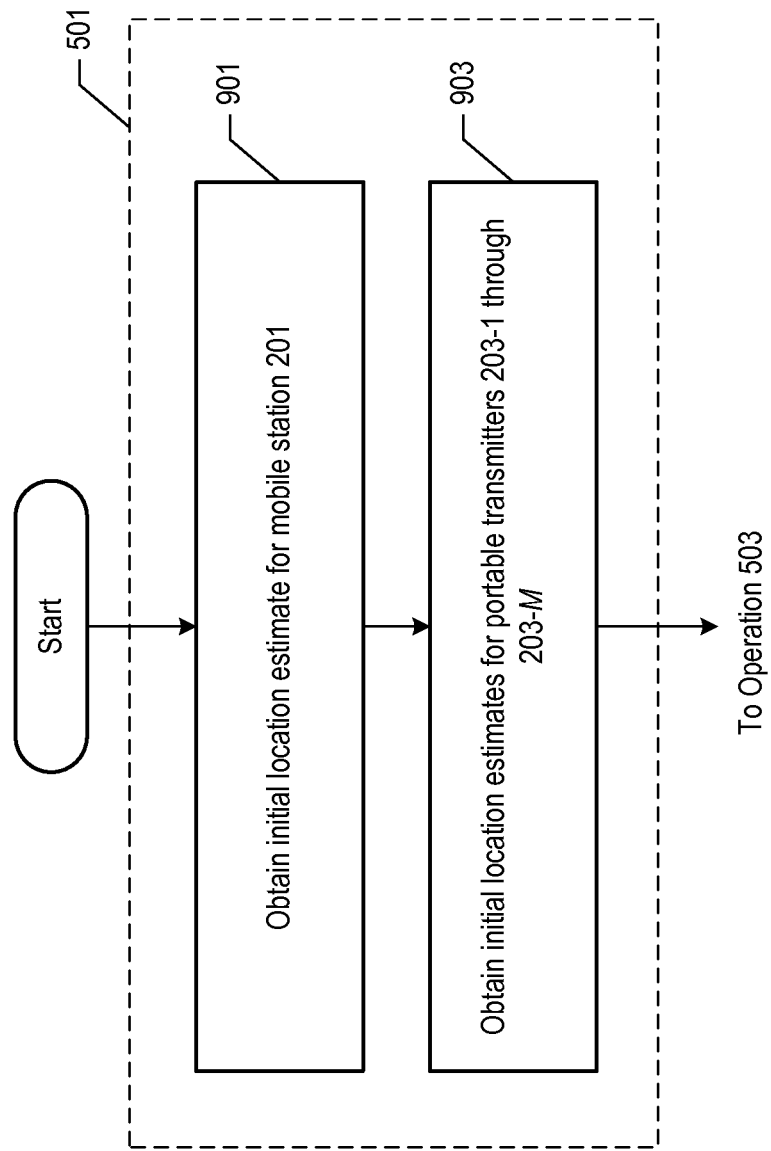
FIG. 9 depicts a flowchart of the salient processes performed in obtaining initial location estimates.

FIG. 9 depicts a flowchart of the salient processes performed in obtaining initial location estimates.

At operation 901, intercept server 215 obtains an initial location estimate for mobile station 201. Relatively speaking, this initial location estimate is typically a unenhanced estimate compared to the enhanced location estimate that is to be generated for the mobile station, in accordance with an illustrative embodiment of the present invention. This initial estimate can be obtained by using any of a variety of prior-art techniques that include, while not being limited to, cell ID, enhanced cell ID, time of arrival, angle of arrival, GPS, and wireless location signatures.

At operation 903, server 215 obtains an initial location estimate for each of portable transmitters 203-1 through 203-M. This initial estimate can be obtained by using any of a variety of prior-art techniques that include, while not being limited to, cell ID, enhanced cell ID, time of arrival, angle of arrival, GPS, and wireless location signatures, wherein one or more of these techniques can utilize position-determining component 305 of portable transmitter 203-$m$. The difference, however, between mobile station 201 and portable transmitter 203-$m$ is that a higher level of control exists for the portable transmitter, in regard to its placement, movement, and position determining capability; correspondingly, a more accurate location estimate is generally available for the portable transmitter than initially for the mobile station.

Initializing Transmit Parameter Values at Operation 503—

Figure 10:
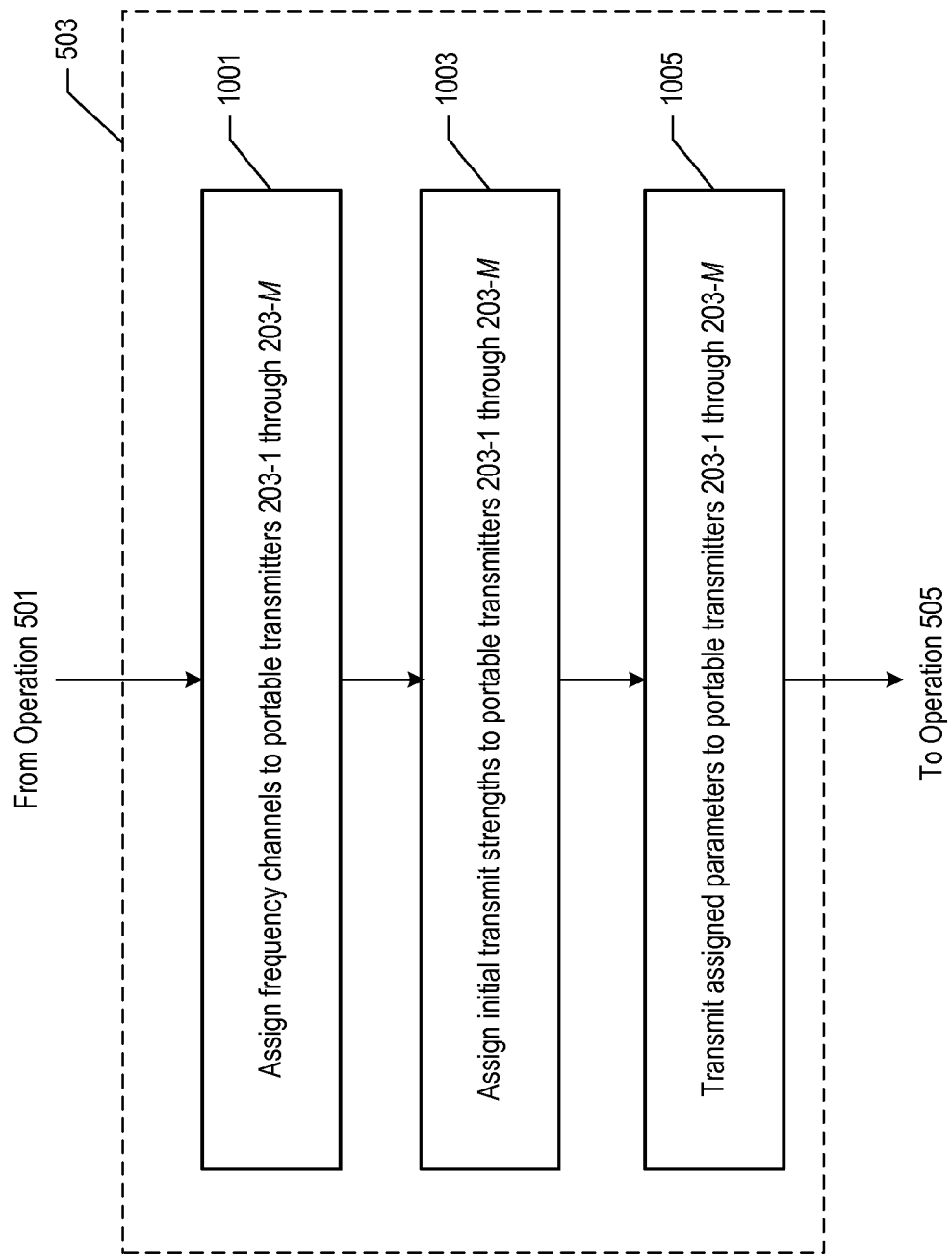
FIG. 10 depicts a flowchart of the salient processes performed in initializing transmit parameter values.

FIG. 10 depicts a flowchart of the salient processes performed in initializing transmit parameter values.

At operation 1001, server 215 assigns frequency channels to portable transmitters 203-1 through 203-M. In some embodiments, the assignment of radio-frequency channels is based on the initial location estimate of mobile station 201.

At operation 1003, server 215 assigns initial transmit strengths to portable transmitters 203-1 through 203-M. In some embodiments, the assignment of the initial transmit strengths is specifically based on the initial location estimate of mobile station 201.

At operation 1005, server 215 transmits the parameters assigned at operations 1001 and 1003, to portable transmitters 203-1 through 203-M. In accordance with an illustrative embodiment, server 215 communicates with portable transmitter 203-$m$ directly (i.e., machine-to-machine) which then adjusts the transmit parameters accordingly, while in some alternative embodiments server 215 communicates with a user of portable transmitter 203-$m$ (i.e., machine-to-human) and the user adjusts the transmit parameters. Portable transmitter 203-$m$ then proceeds to transmit an electromagnetic signal based on the parameters transmitted to it by server 215.

Receive and Analyze Measurement Report Data at Operation 505—

Figure 11:
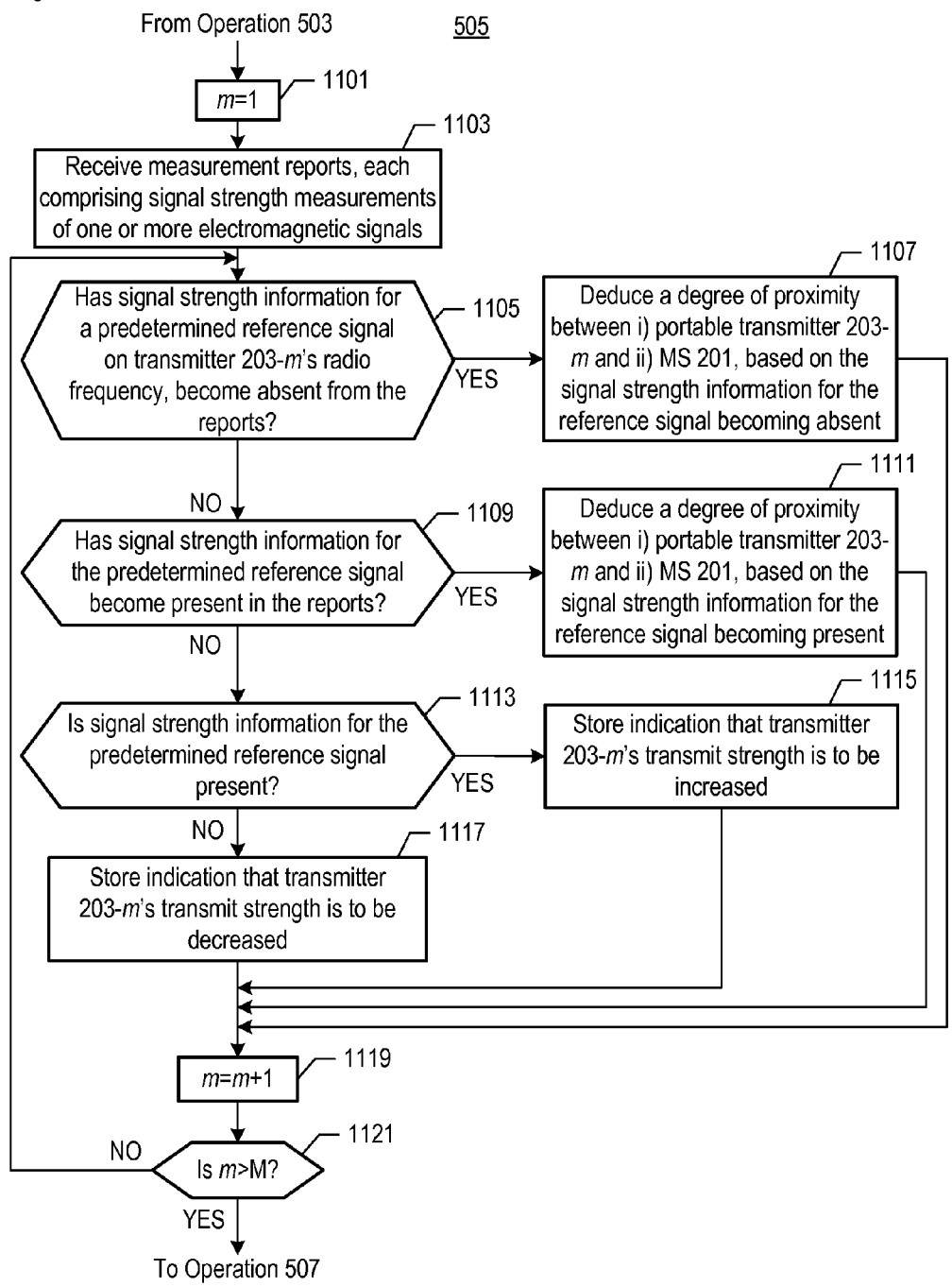
FIG. 11 depicts a flowchart of the salient processes performed receiving and analyzing a measurement report generated by mobile station 201 and comprising one or more signal strength measurements.

FIG. 11 depicts a flowchart of the salient processes performed receiving and analyzing a measurement report generated by mobile station 201 and comprising one or more signal strength measurements. Mobile station 201, including its user, is being provided telecommunications service by the wireless telecommunications network, or "wireless network," that serves geographic region 220.

At operation 1101, intercept server 215 initializes counter m to 1. Counter m serves as an index to the particular portable transmitter 203-$m$ that is being processed at the moment.

At operation 1103, server 215 receives one or more measurement reports generated by mobile station 201, each report comprising one or more signal strength measurements. In accordance with an illustrative embodiment, server 215 requests the one or more measurement reports (e.g., from location server 214, from wireless switching center 211, etc.), while in some alternative embodiments server 215 is provided the measurement reports automatically.

At operation 1105, server 215 determines whether signal-strength information, comprising one or more measurements, for an expected signal has become absent from the received measurement reports, wherein the expected signal is being transmitted at the same radio frequency as the signal being transmitted by portable transmitter 203-$m$. The signal is "expected" from the perspective of the wireless telecommunications network that provides telecommunications service to mobile station 201. For example, the service network might be using the signal as a reference signal for handoff-related measurements performed by the mobile. This absence of the signal can be determined, for example and without limitation, by server 215 keeping track of previous measurement reports comprising a predetermined BSIC, or other information identifying the reference signal, where a signal measurement corresponding to the BSIC is now absent from the current measurement report. Presumably, the cause for the sudden absence of the BSIC is due to portable transmitter 203-$m$'s signal being strong enough (and the transmitter being close enough to the mobile) to be acting as an interferer.

If signal-strength information for the expected signal has become absent from the measurement reports, control of execution proceeds to operation 1107. If not, control of execution proceeds to operation 1109.

At operation 1107, server 215 deduces a degree of proximity between i) portable transmitter 203-$m$ and ii) mobile station 201, based on a transition from a presence of to an absence of signal-strength information corresponding to the predetermined BSIC, as described in operation 1105 and because of portable transmitter 203-*m*'s signal being strong enough to interfere with mobile station 201's ability to successfully decode and report the signal with the predetermined BSIC.

In some embodiments, the degree of proximity between the portable transmitter and the mobile station is characterized in relative terms, in that the degree of proximity is characterized as "relatively near" because the absence or loss of the signal-strength information corresponding to the predetermined BSIC. In some other embodiments, the degree of proximity is instead characterized as a quantifiable distance, based on the absence or loss of the signal-strength information, in combination with one or both of i) the signal strength measurement or measurements included in one or more previous measurement reports received (i.e., prior to signal loss) and ii) the transmit strength at which the electromagnetic signal was transmitted when the signal strength measurements (in the previous reports) were made by mobile station 201.

After operation 1107, control of execution then proceeds to operation 1119.

At operation 1109, server 215 determines whether signal-strength information, comprising one or more measurements, for an expected signal that is being transmitted at the same radio frequency as the signal being transmitted by portable transmitter 203-*m*, has become present in the received measurement reports. The signal is "expected" from the perspective of the wireless telecommunications network that provides telecommunications service to mobile station 201. For example, the service network might be using the signal as a reference signal for handoff-related measurements performed by the mobile. This presence of the signal can be determined, for example and without limitation, by server 215 keeping track of previous measurement reports comprising a predetermined BSIC, or other information identifying the reference signal, where a signal measurement corresponding to the BSIC is now present in the current measurement report. Presumably, the cause for the sudden presence of the BSIC is due to portable transmitter 203-*m*'s signal being insufficient (and the transmitter being far enough from the mobile) to be acting as an interferer.

If signal-strength information for the expected signal has become present in the measurement reports, control of execution proceeds to operation 1111. If not, control of execution proceeds to operation 1113.

At operation 1111 and having determined signal-strength information for the predetermined reference signal to be present, server 215 deduces a degree of proximity between i) portable transmitter 203-*m* and ii) mobile station 201, based on a transition from an absence to a presence of signal-strength information corresponding to the predetermined BSIC, and because of portable transmitter 203-*m*'s signal being too weak to interfere with mobile station 201's ability to successfully decode and report the signal with the predetermined BSIC.

In some embodiments, the degree of proximity between the portable transmitter and the mobile station is characterized in relative terms, in that the degree of proximity is characterized as "relatively far" because the presence or acquisition of the signal-strength information corresponding to the predetermined BSIC. In some other embodiments, the degree of proximity is instead characterized as a quantifiable distance, based on the presence or acquisition of the signal-strength information, in combination with one or both of i) the signal strength measurement included in the received measurement report and ii) the transmit strength at which the electromagnetic signal is transmitted when the signal strength measurement is made by mobile station 201.

After operation 1111, control of execution then proceeds to operation 1119.

At operation 1113, server 215 determines whether signal-strength information for the expected reference signal referred to earlier is currently present in the measurement report. If the signal-strength information is present, control of execution proceeds to operation 1115 for the purpose of indicating that the transmit strength used by portable transmitter 203-*m* is to be increased. If not, control of execution proceeds to operation 1117 for the purpose of indicating that the transmit strength is to be decreased.

At operation 1115, server 215 stores an indication that the transmit strength used by portable transmitter 203-*m* is to be increased, as described below and in operation 1405. For example, server 215 might increase the transmit strength in the course of executing operation 1113 across multiple iterations until the signal-strength information for the reference signal is no longer detected, thereby helping to determine a location at which such a transition occurs. As those who are skilled in the art will appreciate after reading this specification, the transmit strength used by portable transmitter 203-*m* can be gradually stepped up at a predetermined interval (e.g., once per second, etc.), enabling server 215 to correlate these steps with the received measurement reports to determine at what power setting the particular reference signal is lost (i.e., the corresponding neighbor stopped being reported by mobile station 201). After operation 1115, control of execution then proceeds to operation 1119.

At operation 1117, server 215 stores an indication that the transmit strength used by portable transmitter 203-*m* is to be decreased, as described below and in operation 1405. For example, server 215 might decrease the transmit strength in the course of executing operation 1109 across multiple iterations until the signal-strength information for the reference signal is detected, thereby helping to determine a location at which such a transition occurs. As those who are skilled in the art will appreciate after reading this specification, the transmit strength used by portable transmitter 203-*m* can be gradually stepped down at a predetermined interval (e.g., once per second, etc.), enabling server 215 to correlate these steps with the received measurement reports to determine at what power setting the particular reference signal is acquired.

At operation 1119, server 215 increments counter m.

At operation 1121, server 215 determines if the value of counter m is greater the value of M (i.e., the number of portable transmitters being used). If m is greater than M, signifying that all portable transmitters have been considered for the current measurement report, then control of execution proceeds to operation 507. Otherwise, control of execution proceeds to operation 1105.

Generate Enhanced Location Estimate at Operation 507—

Figure 12:
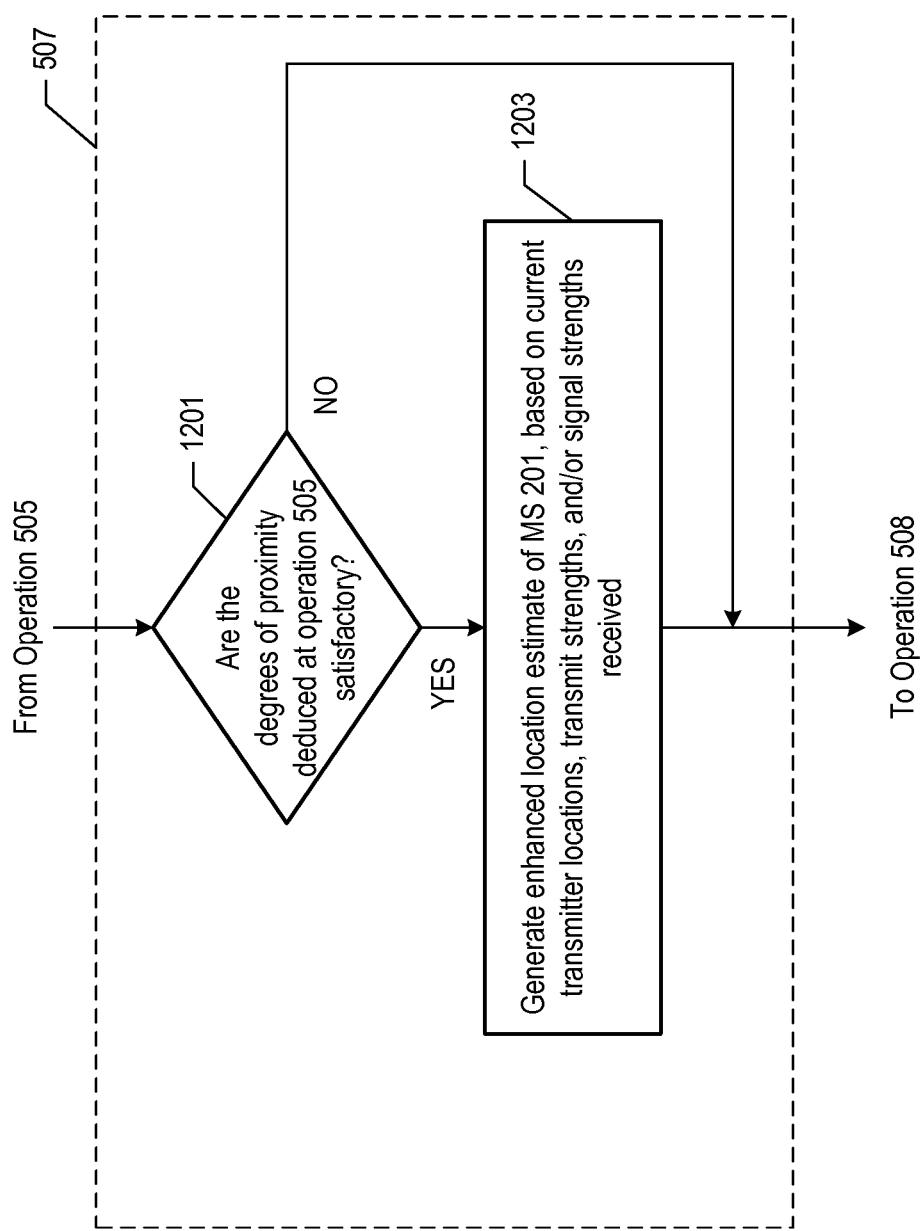
FIG. 12 depicts a flowchart of the salient processes performed in generating an updated, enhanced location estimate.

FIG. 12 depicts a flowchart of the salient processes performed for generating an updated, enhanced location estimate for mobile station 201.

At operation 1201, server 215 optionally determines whether the degrees of proximity deduced at operation 1107, for one or more portable transmitters, are satisfactory or not. As those who are skilled in the art will appreciate, after reading this disclosure, one or more techniques can be used to determine whether the degrees of proximity are satisfactory, such as i) whenever a single transmitter's degree of proximity equates to being less than a predetermined distance (e.g., 10 meters, etc.), ii) whenever P or more transmitters' proximities to the mobile station equate to being less than a predetermined distance (P being a positive integer less than or equal to M), or iii) whenever P or more transmitters' proximities to the mobile station equate to being less than a predetermined distance for a specified amount of time, for example and without limitation. If the degrees of proximity are satisfactory, control of execution proceeds to operation 1203. Otherwise, control of execution proceeds to operation 508.

At operation 1203, server 215 generates an enhanced location estimate of mobile station 201, based on one or more of i) the current transmitter locations of one or more of portable transmitters 203-1 through 203-M, ii) the respective transmit strengths, and iii) the corresponding signal strengths of the signals received by mobile station 201. After operation 1203, control of execution proceeds to operation 508.

Obtaining Constituent Location Estimates at Operation 509—

Figure 13:
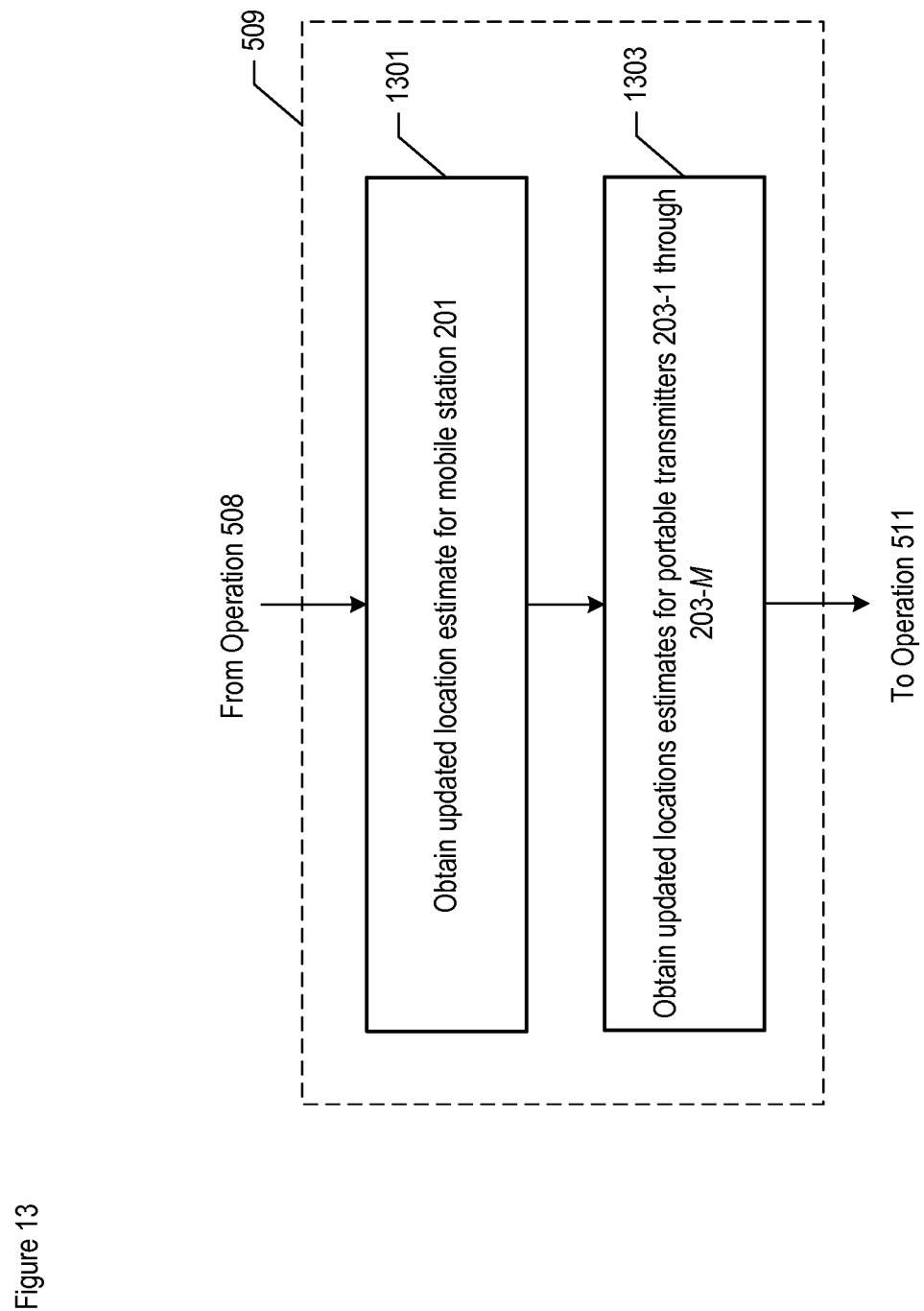
FIG. 13 depicts a flowchart of the salient processes performed in obtaining constituent location estimates.

FIG. 13 depicts a flowchart of the salient processes performed in obtaining constituent location estimates, which will be used to generate an updated, enhanced location estimate for mobile station 201.

At operation 1301, intercept server 215 obtains an updated, unenhanced location estimate for mobile station 201. An unenhanced location estimate for mobile station 201 differs from an enhanced location estimate for mobile station 201, in that the unenhanced location estimate does not utilize information provided by or derived from the portable transmitters while the enhanced estimate does. This updated, unenhanced estimate can be obtained by using any of a variety of prior-art techniques that include, while not being limited to, cell ID, enhanced cell ID, time of arrival, angle of arrival, GPS, and wireless location signatures. In some embodiments of the present invention, this updated estimate might be based on one or more of the operations executed as described above and in FIG. 11.

In some alternative embodiments of the present invention, mobile station 201 is assumed to be stationary, and, as a result, operation 1301 can be omitted.

At operation 1303, server 215 obtains an updated location estimate for each of portable transmitters 203-1 through 203-M. This updated estimate can be obtained by using any of a variety of prior-art techniques that include, while not being limited to, cell ID, enhanced cell ID, time of arrival, angle of arrival, GPS, and wireless location signatures, wherein one or more of these techniques can utilize position-determining component 305 of portable transmitter 203-*m*.

Updating Transmit Parameter Values at Operation 511—

Figure 14:
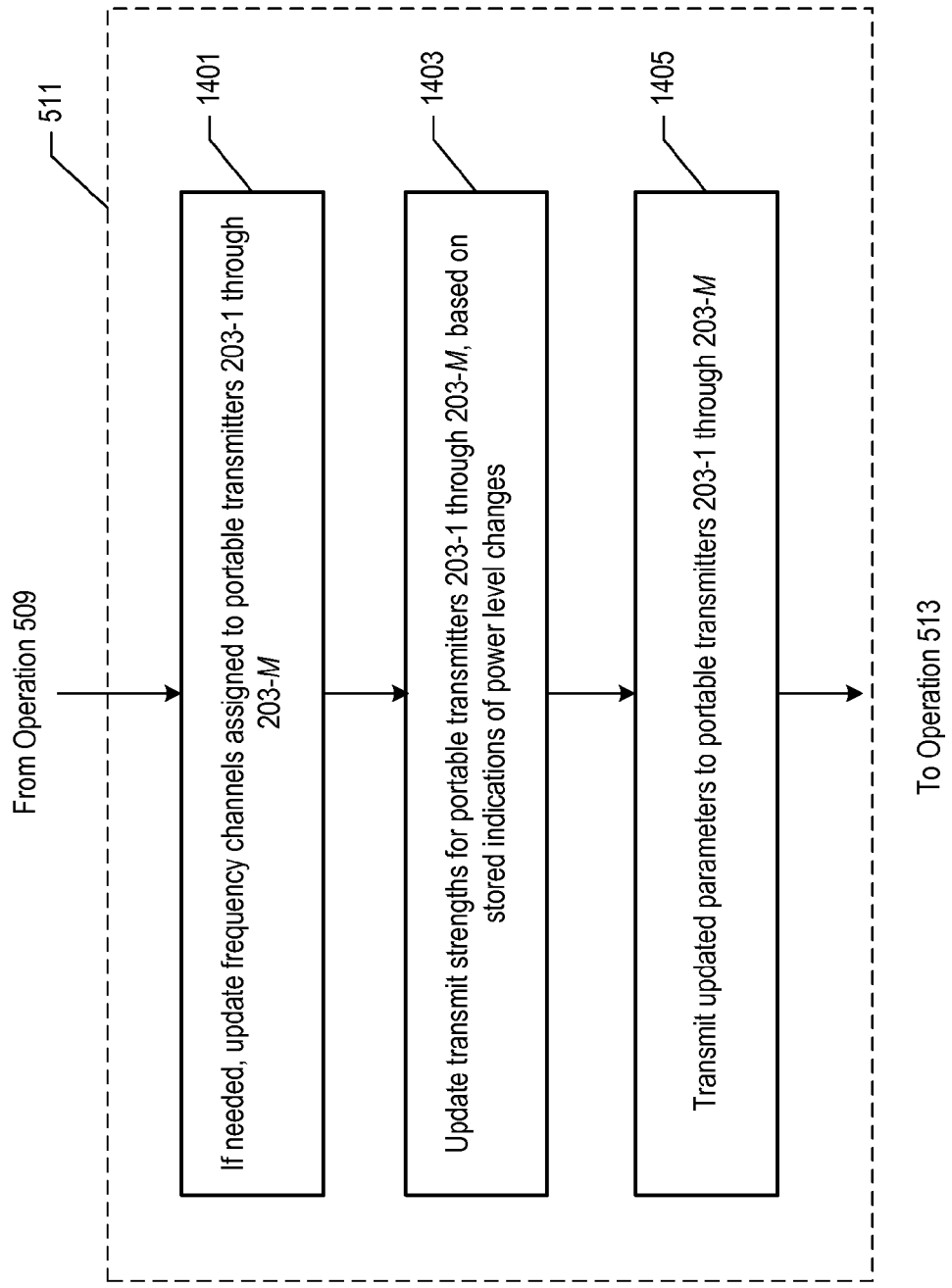
FIG. 14 depicts a flowchart of the salient processes performed in updating transmit parameter values.

FIG. 14 depicts a flowchart of the salient processes performed in updating transmit parameter values. This operation might be necessary because either mobile station 201 or one or more of the portable transmitters, or both, have moved from their previous positions.

At operation 1401, server 215 can reassign frequency channels to portable transmitters 203-1 through 203-M. In some embodiments, the assignment of radio-frequency channels is based on the updated location estimate of mobile station 201.

At operation 1403, server 215 assigns updated transmit strengths to portable transmitters 203-1 through 203-M, based on one or more of operation 1109 and operation 1113. In some embodiments, the assignment of the updated transmit strengths is specifically based on the updated location estimate of mobile station 201.

At operation 1405, and similar to operation 1005, server 215 transmits the parameters assigned at operations 1401 and 1403, to portable transmitters 203-1 through 203-M.

Processing Movement Instructions at Operation 513—

Figure 15:
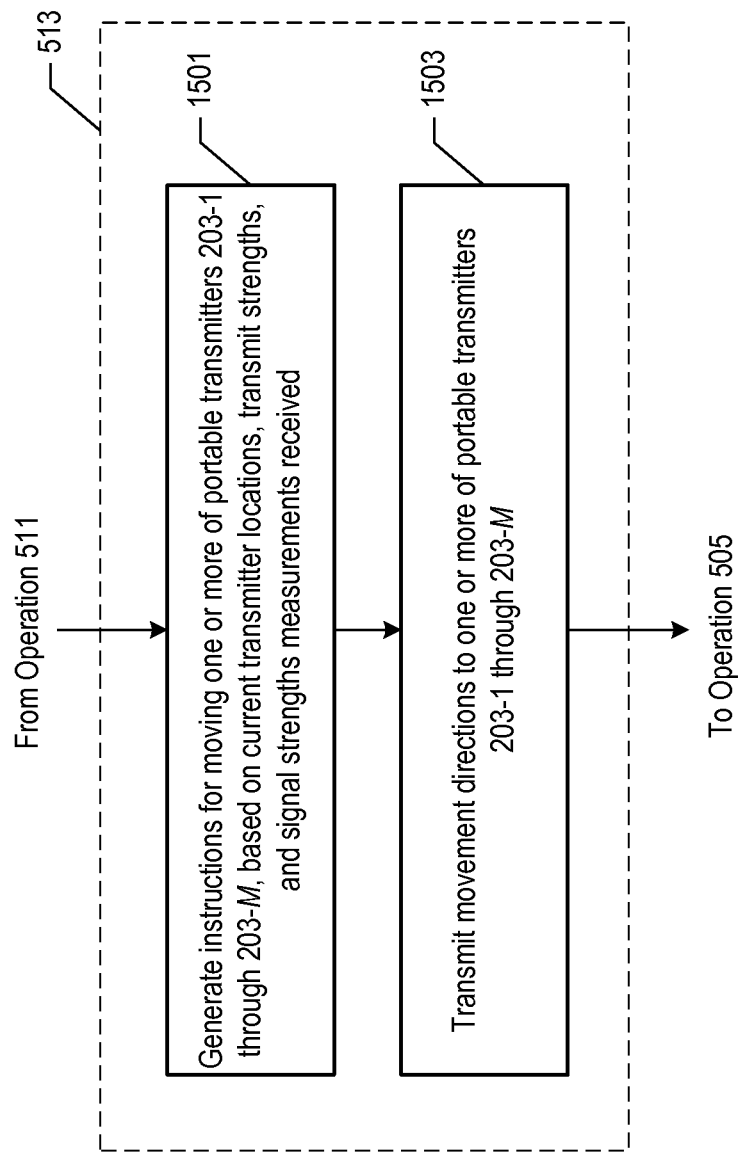
FIG. 15 depicts a flowchart of the salient processes performed in generating one or more movement instructions and transmitting them to the applicable portable transmitters.

FIG. 15 depicts a flowchart of the salient processes performed in generating one or more movement instructions and transmitting them to the applicable portable transmitters.

At operation 1501, intercept server 215 generates an instruction for moving one or more portable transmitters 203-1 through 203-M. The instruction can be based on one or more of: i) one or more of the signal strengths in one or more measurement reports received, ii) one or more of the current and/or past locations of one or more of the portable transmitters, and iii) one or more the transmit strengths, for example and without limitation.

At operation 1503, server 215 transmits the instruction or instructions generated at operation 1501, to one or more of portable transmitters 203-1 through 203-M. In accordance with an illustrative embodiment, server 215 communicates with portable transmitter 203-*m* directly (i.e., machine-to-machine) which then adjusts the transmit parameters accordingly, while in some alternative embodiments server 215 communicates with a user of portable transmitter 203-*m* (i.e., machine-to-human) and the user adjusts the transmit parameters. Portable transmitter 203-*m* then transmits its electromagnetic signal based on the parameters transmitted to it by server 215.

After operation 1503, control of execution proceeds to operation 505.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A system comprising:
a transmitter configured to transmit a first signal at a first radio frequency, wherein the transmit strength of the first signal is decreased according to a series of steps; and
a server computer configured to
a) receive a series of measurement reports generated by a mobile station,
b) correlate the series of steps of decreased transmit strength with the series of measurement reports, in order to determine when signal-strength information corresponding to a second signal becomes present in the series of measurement reports, wherein the second signal is being transmitted i) by a source other than the transmitter and ii) at the first radio frequency, and
c) generate a location estimate of the mobile station based on the transmit strength at which the signal-strength information for the second signal becomes present.

2. The system of claim 1 wherein the server computer is further configured to transmit the location estimate of the mobile station.

3. The system of claim 1 wherein the server computer is further configured to generate the location estimate based on a location where the transmitter transmits the first signal at one or more of the stepped transmit strengths.

4. The system of claim 1 wherein the server computer is further configured to:
obtain an initial location estimate of the mobile station; and
assign the first radio frequency to the transmitter based on the initial location estimate of the mobile station, prior to the transmit strength being decreased.

5. The system of claim 1 wherein the server computer is further configured to generate an instruction for moving the transmitter based on the transmit strength at which the signal-strength information for the second signal becomes present.

6. A method comprising:
decreasing, according to a series of steps, the transmit strength of a first signal transmitted by a transmitter at a first radio frequency;

receiving, by a server computer, a series of measurement reports generated by a mobile station;

correlating, by the server computer, the series of steps of decreased transmit strength with the series of measurement reports, in order to determine when signal-strength information corresponding to a second signal becomes present in the series of measurement reports, wherein the second signal is being transmitted i) by a source other than the transmitter and ii) at the first radio frequency; and generating, by the server computer, a location estimate of the mobile station based on the transmit strength at which the signal-strength information for the second signal becomes present.

7. The method of claim 6 further comprising transmitting, by the server computer, the location estimate of the mobile station.

8. The method of claim 6 wherein the location estimate is further based on a location where the transmitter transmits the first signal at one or more of the stepped transmit strengths.

9. The method of claim 6 further comprising:
obtaining, by the server computer, an initial location estimate of the mobile station; and
assigning, by the server computer, the first radio frequency to the transmitter based on the initial location estimate of the mobile station, prior to the decreasing of the transmit strength.

10. The method of claim 6 further comprising generating, by the server computer, an instruction for moving the transmitter based on the transmit strength at which the signal-strength information for the second signal becomes present.

11. A system comprising:
a portable transmitter configured to transmit a first signal at a first radio frequency; and
a server computer comprising:
a) a transceiver configured to receive a series of measurement reports generated by a mobile station; and
b) a processor configured to
correlate (i) a series of steps of decreasing transmit strength of the first signal transmitted by the portable transmitter at the first radio frequency, with (ii) the series of measurement reports, in order to determine when signal-strength information corresponding to a second signal becomes present in the series of measurement reports, wherein the second signal is being transmitted (a) by a source other than the portable transmitter and (b) at the first radio frequency, and
generate an instruction for moving the portable transmitter, wherein the instruction is based on the transmit strength at which the signal-strength information for the second signal becomes present.

12. The system of claim 11 wherein the transceiver is further configured to transmit the instruction for moving the portable transmitter.

13. The system of claim 11 wherein the processor is further configured to generate a location estimate of the mobile station based on a location where the portable transmitter transmits the first signal at one or more of the stepped transmit strengths.

14. The system of claim 13 wherein the location estimate is further based on the transmit strength at which the signal-strength information for the second signal becomes present.

15. The system of claim 11 wherein the server computer is further configured to:
obtain an initial location estimate of the mobile station; and
assign the first radio frequency to the portable transmitter based on the initial location estimate of the mobile station.

16. A method comprising:
transmitting, by a portable transmitter, a first signal at a first radio frequency;
receiving, by a server computer, a series of measurement reports generated by a mobile station;
correlating, by the server computer, (a) a series of steps of decreasing transmit strength of the first signal transmitted by the portable transmitter at the first radio frequency, with (b) the series of measurement reports, in order to determine when signal-strength information corresponding to a second signal becomes present in the series of measurement reports, wherein the second signal is being transmitted (1) by a source other than the portable transmitter and (2) at the first radio frequency; and
generating, by the server computer, an instruction for moving the portable transmitter, wherein the instruction is based on the transmit strength at which the signal-strength information for the second signal becomes present.

17. The method of claim 16 further comprising transmitting, by the server computer, the instruction for moving the portable transmitter.

18. The method of claim 16 further comprising generating, by the server computer, a location estimate of the mobile station based on a location where the portable transmitter transmits the first signal at one or more of the stepped transmit strengths.

19. The method of claim 18 wherein the location estimate is further based on the transmit strength at which the signal-strength information for the second signal becomes present.

20. The method of claim 16 further comprising:
obtaining, by the server computer, an initial location estimate of the mobile station; and
assigning, by the server computer, the first radio frequency to the portable transmitter based on the initial location estimate of the mobile station.

* * * * *